(12) United States Patent
Schnitman et al.

(10) Patent No.: US 12,490,800 B2
(45) Date of Patent: Dec. 9, 2025

(54) FOOTWEAR ASSEMBLY WITH 3-D PRINTED, MODULAR SOLE ASSEMBLY

(71) Applicant: HILOS, Inc., Portland, OR (US)

(72) Inventors: Mikele Schnitman, Portland, OR (US); Gaia Giladi, Portland, OR (US); Elias Stahl, Portland, OR (US)

(73) Assignee: HILOS, Inc., Portland, OR (US)

( * ) Notice: Subject to any disclaimer, the term of this patent is extended or adjusted under 35 U.S.C. 154(b) by 0 days.

(21) Appl. No.: 18/448,098

(22) Filed: Aug. 10, 2023

(65) Prior Publication Data

US 2024/0130465 A1 Apr. 25, 2024
US 2024/0225179 A9 Jul. 11, 2024

Related U.S. Application Data

(60) Provisional application No. 63/418,428, filed on Oct. 21, 2022.

(51) Int. Cl.
*A43B 13/12* (2006.01)
*A43B 3/24* (2006.01)
(Continued)

(52) U.S. Cl.
CPC .......... *A43B 13/125* (2013.01); *A43B 3/246* (2013.01); *A43B 13/14* (2013.01); *A43B 13/36* (2013.01); *B33Y 80/00* (2014.12)

(58) Field of Classification Search
CPC .......... A43B 3/24; A43B 3/244; A43B 3/246; A43B 3/248; A43B 13/125; A43B 13/14; A43B 13/36

See application file for complete search history.

(56) References Cited

U.S. PATENT DOCUMENTS 3,890,725 A * 6/1975 Lea .................. A43B 3/244
36/11.5
3,902,259 A * 9/1975 Cracco .................. A43B 3/24
36/11.5

(Continued)

FOREIGN PATENT DOCUMENTS

CN 100420401 C 9/2008
WO WO-2011051984 A1 * 5/2011 ............ A43B 13/28
WO 2020207605 A1 10/2020

OTHER PUBLICATIONS

International Searching Authority, International Search Report and Written Opinion, PCT Patent Application PCT/US2023/030021, mailed Oct. 25, 2023, 10 pages.

*Primary Examiner* — F Griffin Hall
(74) *Attorney, Agent, or Firm* — Perkins Coie LLP

(57) ABSTRACT

Footwear with a modular sole assembly having an insole portion connected to an upper. The insole portion can have a compressible lattice with interconnected laths to provide support for the wearer's foot. A midsole portion is connected to the insole portion and has a midsole perimeter portion that interfaces with the insole perimeter portion. The midsole portion is modularly affixed to the insole portion. An outsole portion is connected to the midsole portion. First locking features are integrally formed along the lower perimeter portion of the upper or along the insole perimeter portion. Second locking features are integrally formed along the midsole portion and configured to releasably mate with the first locking features and fixedly hold the midsole portion together with the insole portion and the upper without use of cement bonding or other adhesive material.

19 Claims, 20 Drawing Sheets

(51) Int. Cl.
*A43B 13/14* (2006.01)
*A43B 13/36* (2006.01)
*B33Y 80/00* (2015.01)

(56) References Cited

U.S. PATENT DOCUMENTS

| | | | | |
|---|---|---|---|---|
| 4,267,650 | A * | 5/1981 | Bauer | A43B 3/24 36/15 |
| 4,420,894 | A * | 12/1983 | Glassman | A43B 13/36 36/12 |
| 4,839,948 | A * | 6/1989 | Boros | A43B 3/24 24/664 |
| 4,887,369 | A * | 12/1989 | Bailey | A43B 3/24 36/15 |
| 5,317,822 | A | 6/1994 | Johnson | |
| 6,895,697 | B2 * | 5/2005 | Yang | A43B 3/244 36/101 |
| 6,931,766 | B2 * | 8/2005 | Greene | A43B 3/122 36/15 |
| 7,234,248 | B2 * | 6/2007 | Kelley | A43B 3/122 12/146 BC |
| 7,246,453 | B2 * | 7/2007 | Kim | A43B 21/39 36/15 |
| 8,069,583 | B1 * | 12/2011 | Simchuk | A43B 21/39 36/31 |
| 8,307,570 | B2 * | 11/2012 | Delgatty | A43B 13/189 36/15 |
| 8,910,399 | B2 * | 12/2014 | Ickrath | A43B 7/38 206/505 |
| 9,486,036 | B1 * | 11/2016 | Douglas | A43B 23/0245 |
| 9,883,713 | B2 * | 2/2018 | Kawakami | A43B 3/24 |
| 9,974,353 | B2 * | 5/2018 | Mulholland | A43B 13/26 |
| 10,258,110 | B2 * | 4/2019 | Sussmann | A43B 13/181 |
| 11,160,326 | B2 * | 11/2021 | Bramani | A43B 3/244 |
| 11,432,612 | B1 * | 9/2022 | Gomez | A43B 13/28 |
| 11,457,687 | B2 * | 10/2022 | Kundani Kumta | A43B 3/246 |
| 11,497,274 | B2 * | 11/2022 | Bentvelzen | G05B 19/41805 |
| 2002/0174569 | A1 * | 11/2002 | Tsai | A43B 3/103 36/11.5 |
| 2013/0091738 | A1 | 4/2013 | Peikert et al. | |
| 2018/0055138 | A1 * | 3/2018 | Osborn | A43B 17/14 |
| 2021/0282497 | A1 | 9/2021 | Lyden | |
| 2021/0321716 | A1 | 10/2021 | Kormann et al. | |
| 2021/0330030 | A1 | 10/2021 | Folsom et al. | |
| 2024/0122295 | A1 * | 4/2024 | Matsuhisa | A43B 13/28 |
| 2025/0204646 | A1 * | 6/2025 | Zach | A43B 3/246 |
| 2025/0212999 | A1 * | 7/2025 | Zach | A43B 13/16 |

* cited by examiner

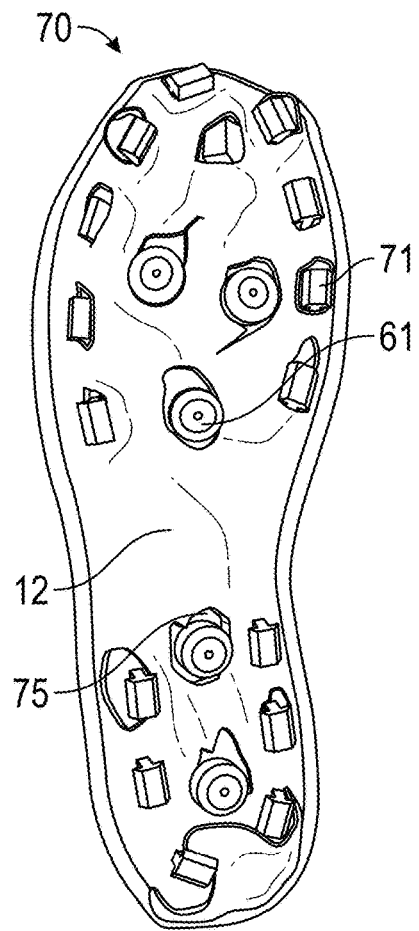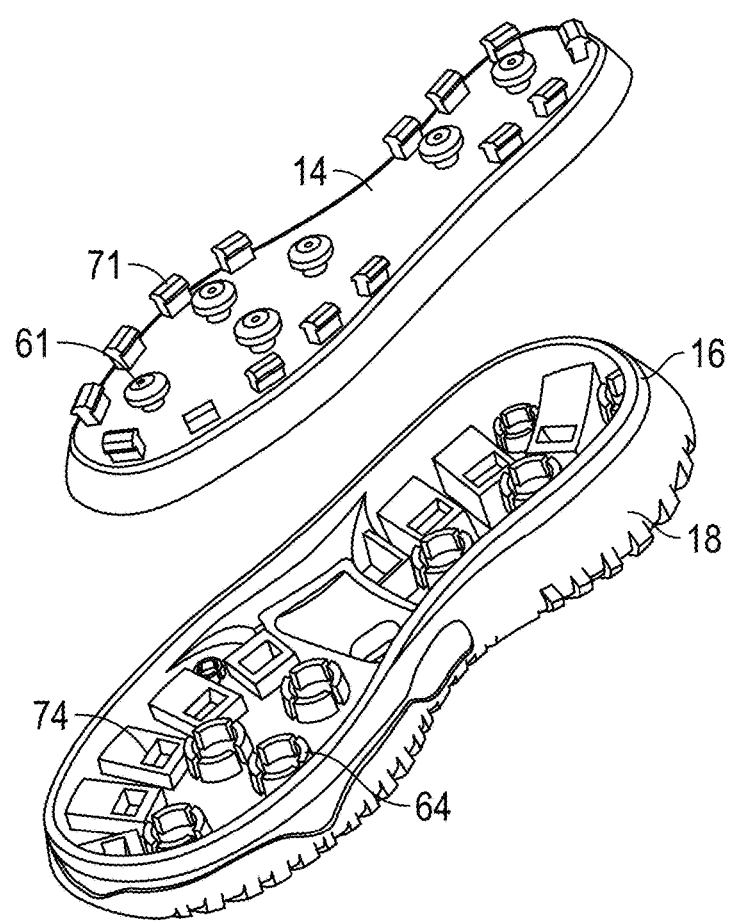
FIG. 7A                    FIG. 7B

FOOTWEAR ASSEMBLY WITH 3-D PRINTED, MODULAR SOLE ASSEMBLY

CROSS-REFERENCE TO RELATED APPLICATIONS

This application claims the benefit of and priority to U.S. Application No. 63/418,428, entitled "FOOTWEAR ASSEMBLY WITH 3-D PRINTED, MODULAR SOLE ASSEMBLY," filed Oct. 21, 2022, which is incorporated herein in its entirety by reference thereto.

TECHNICAL FIELD

This patent application is generally directed to footwear, and more particularly to modular sole assembly with a 3-D printed or additive manufacturing construction.

BACKGROUND

Typically, footwear is assembled by bonding or affixing several separate layers together (e.g., insole, midsole, and outsole) to form a sole and an upper attached to these several layers by relying on the layering method. An upper covers the top and sides of the user's foot, and the sole covers the bottom of the user's foot and makes contact with the ground. The upper and the sole components, and/or parts thereof, can be assembled together during manufacture or after manufacturing of each component. The conventional footwear has a large number of components that must be created, finished, and assembled into the final product. As a result, each of these many parts must be handled during assembly, which can make the assembly process labor intensive. In addition, the large number of components results in a large parts inventory that must be managed. The process of creating, lasting, assembling, and finishing the footwear with so many components is quite labor intensive, which increases the cost and complexity of constructing the conventional footwear. There is a need for a footwear assembly with significantly fewer components and that can be made and assembled quickly, easily, and inexpensively, while still providing a highly fashionable, functional, durable, and comfortable product. A significant improvement in footwear technology is disclosed in Applicant's U.S. Provisional Patent Application No. 63/345,833, titled Footwear Assembly with 3-D Printed Sole Assembly, filed May 25, 2022, which is incorporated herein in its entirety by reference thereto. Notwithstanding this improved technology, footwear with a modular sole assembly whose parts can be easily assembled, refurbished, recycled, and/or swapped out according to demand (e.g., for specific sizes, designs), and which can minimize the parts inventory that must be managed by the manufacturer or retailer is highly desirable.

SUMMARY

The footwear assemblies and related methods disclosed herein overcome drawbacks of the prior art and provide additional benefits. An embodiment of the present technology provides a footwear assembly, comprising an upper defining an interior area configured to receive a foot of a wearer, wherein the upper has a lower perimeter portion. A modular sole assembly is secured to the lower perimeter portion of the upper. The sole assembly is made by one or more additive manufacturing processes and is free of adhesive to hold the sole assembly components together. The sole assembly has an insole portion connected to the lower perimeter portion of the upper. The insole portion can have a compressible lattice configured for absorption of compressive loads from the wearer's foot, and the lattice has interconnected laths extending away from a platform layer configured to provide support for the wearer's foot. The insole portion has an insole perimeter portion, and the insole portion forms a first sole module. A midsole portion is connected to the insole portion and comprises a midsole perimeter portion that interfaces with the insole perimeter portion. At least the midsole portion forms a second sole module releasably affixed to the first sole module. An outsole portion is connected to the midsole portion and positioned to form a ground engaging surface. First locking features are integrally formed along the lower perimeter portion of the upper or along the insole perimeter portion. Second locking features are integrally formed along the midsole portion and configured to releasably mate with the first locking features and fixedly hold the midsole portion together with the insole portion and the upper without use of cement bonding or other adhesive material. This allows the upper to be easily disassembled when needed and recycled or otherwise disposed of separately from the sole assembly, which may be made of a different material.

The insole perimeter portion can have a flange radially outward of the lattice and the lower perimeter portion of the upper is stitched to the flange, and the first locking features are integrally formed along the insole perimeter portion. The first locking features can be integrally formed along the lower perimeter portion of the upper and extend downwardly past the insole perimeter portion and releasably connect to the second locking features. The insole perimeter portion can have a flange radially outward of the lattice, and the lower perimeter portion of the upper is captured between the flange and the midsole perimeter portion. In some embodiments, the first locking features can extend downwardly from the platform layer of the insole portion and have a plurality of engagement hooks. The second locking features comprise a plurality of slots along the midsole perimeter portion configured to mate with and releasably retain the engagement hooks. In some embodiments, the first locking features comprise a plurality of locking tabs spaced apart from each other along the lower perimeter portion of the upper or along the insole perimeter portion. The midsole portion comprises a plurality of slots positioned along the midsole perimeter portion, wherein the locking tabs extend through the slots and connect to the locking posts to fixedly hold the midsole portion together with the insole portion and the upper.

In some embodiments, the footwear assembly comprises an upper defining an interior area configured to receive a foot of a wearer, and the upper has a lower perimeter portion. A sole assembly is coupled to the upper, wherein the sole assembly comprises a modular construction without using adhesives to join the components of the sole assembly. The sole assembly comprises an insole portion connected to the upper's lower perimeter portion and forming a first sole module. A midsole portion is connected to the insole portion and forming second sole module releasably affixed to the first sole module. The midsole portion comprises a midsole perimeter portion that releasably interfaces with the insole portion. An outsole portion is connected to the midsole portion and is positioned to form a ground engaging surface. First locking features are positioned on a lower portion of the upper or the insole portion. Second locking features are integrally formed along the midsole portion and configured to releasably mate with the first locking features and fixedly hold the midsole portion together with the insole portion and the upper without use of cement bonding or other adhesive material.

Another embodiment of the present technology provides a modular sole assembly for use with a footwear upper. The sole assembly comprises an insole portion coupleable to the footwear upper, and a midsole portion is connected to the insole portion and comprises a modular first forefoot portion. A modular first heel portion is spaced apart from the modular first forefoot portion. An outsole portion is connected to the midsole portion and forms a ground engaging surface. The outsole portion comprises a modular second forefoot portion and a modular second heel portion. The modular second forefoot portion releasably attaches to the modular first forefoot portion along a bottom portion of the midsole portion, and the modular second heel portion releasably attaches to the modular first heel portion along the bottom of the midsole portion. The insole portion, the midsole portion, and the outsole portion are interconnected without use of cement bonding or other adhesive material. The insole portion, the midsole portion, or the outsole portion can be separated from the other of the insole portion, midsole portion, or outsole portion and replaced with a replacement insole, midsole, or outsole portion.

BRIEF DESCRIPTION OF THE DRAWINGS

Embodiments of the footwear assembly and manufacturing process introduced herein may be better understood by referring to the following Detailed Description in conjunction with the accompanying drawings, in which like reference numerals indicate identical or functionally similar elements.

FIG. 7A is a bottom view of an insole portion attached to the bottom portion of an upper of an embodiment of the present technology.

FIG. 7B is a partially inverted, exploded view showing the bottom of the insole portion of FIG. 7A separated from the top of the midsole portion of the sole assembly of the present technology.

Figure 1A:
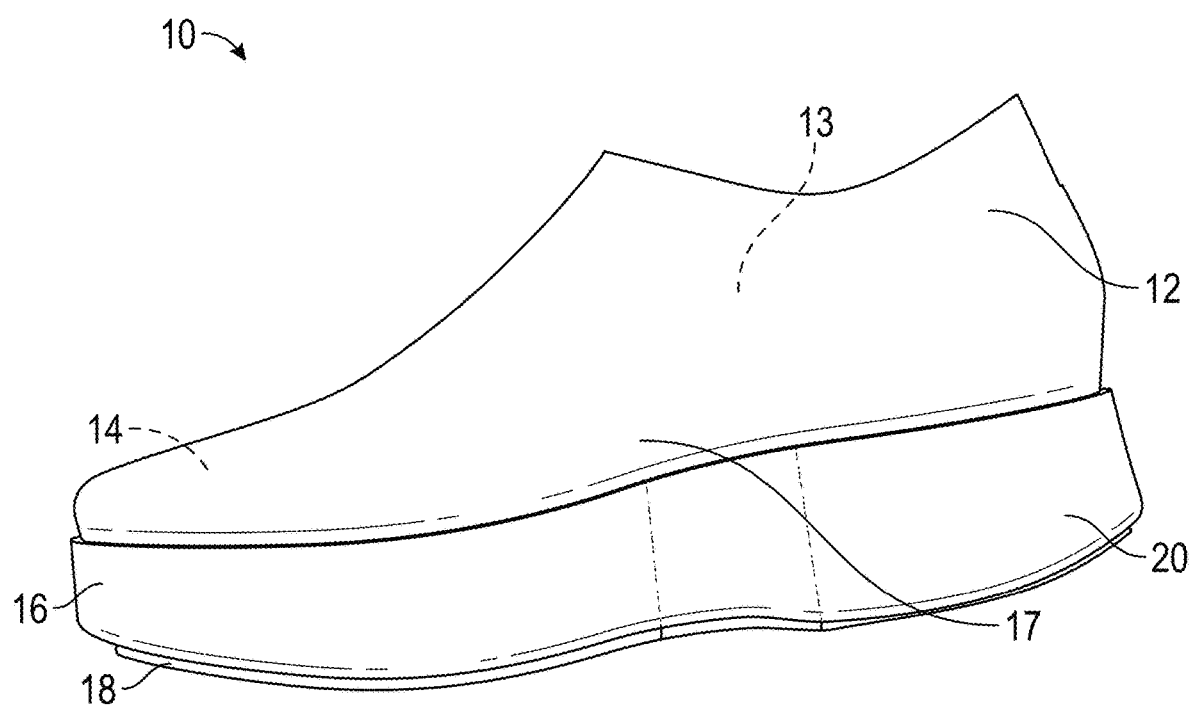
FIGS. 1A and 1B are side and isometric views of footwear assemblies in accordance with one or more embodiments of the present technology.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments.

DETAILED DESCRIPTION

Various examples of the footwear assembly introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description. For purposes of simplicity of discussion, the footwear assembly will be described herein with reference to top and bottom, upper and lower, above and below, and/or left or right relative to the spatial orientation of the embodiment(s) shown in the figures. It is to be understood that the footwear assembly, however, can be moved to and used in different spatial orientations without changing the structure of the system.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Figure 1B:
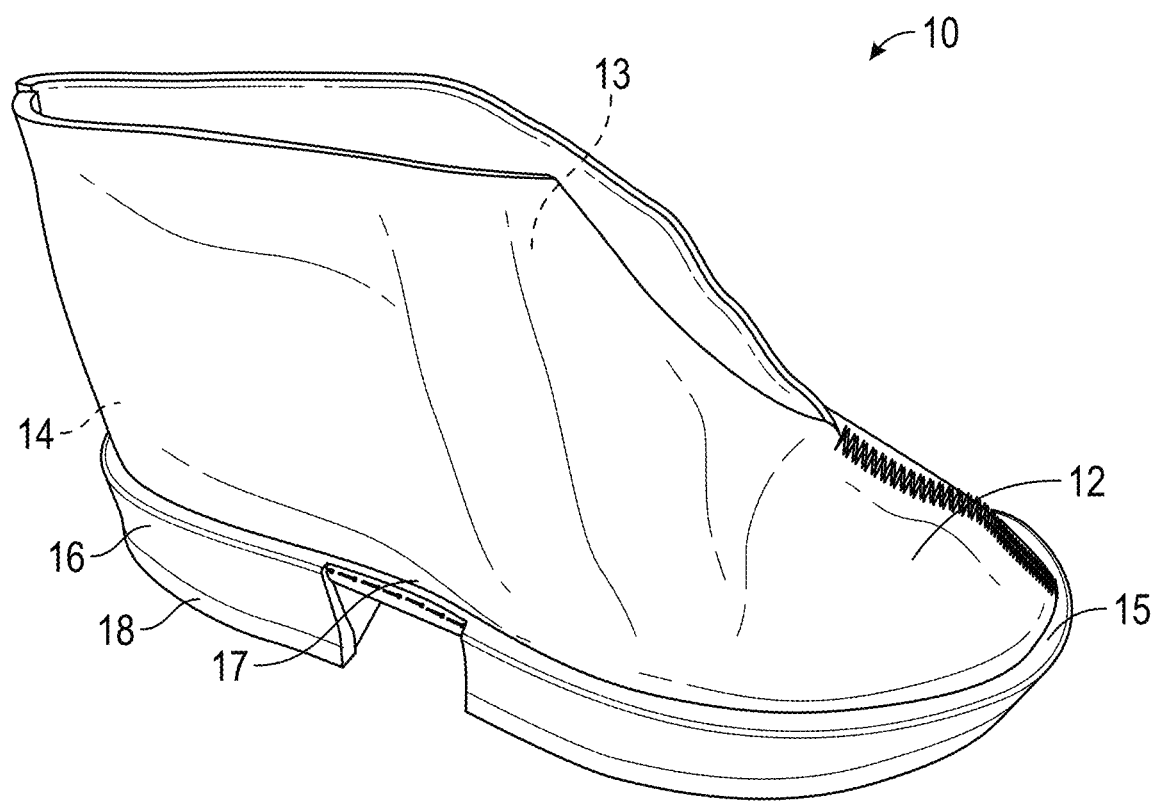

FIGS. 1A and 1B illustrate footwear assemblies 10 in accordance with one or more embodiments of the present technology. The footwear assembly 10 has an upper 12 attached to a sole assembly 20 to define an interior area 13 that receives a foot of a wearer. The footwear assemblies 10 shown in FIGS. 1A and 1B are only two examples of the footwear styles that can include the present technology. It is to be understood that the footwear assembly 10 of the present technology can include other footwear styles, such as styles that may have a heel strap, an enclosed heel cup, an open-toe configuration, or other configurations. Further, the footwear assembly 10 in accordance with the present technology can be a shoe, a boot, a sandal, or other style of footwear.

The sole assembly 20 of the illustrated embodiment is affixed or otherwise coupled to a lower portion of the upper 12. The sole assembly 20 comprises an insole portion 14, a midsole portion 16, and an outsole portion 18. The insole portion 14 is below or within a portion of the upper 12, the midsole portion 16 is below the insole portion 14, and the outsole portion 18 is below the midsole portion 16. In the embodiments in FIGS. 1A and 1B, a lower perimeter portion 17 of the upper 12 is secured to the sole assembly 20. In other embodiments, the lower portion of the upper 12 may wrap around part of the sole assembly 20, such that the actual edge area of the upper 12 may be captured on or within a portion of the sole assembly 20, which is discussed in greater detail below. The upper 12 can be stitched or otherwise attached to the sole assembly 20, such as with other fasteners or a combination of adhesive-free securing techniques. As discussed in greater detail below, the upper 12 or the insole portion 14 has first locking features along a perimeter portion, and the midsole portion 16 has second locking features configured to releasably mate with the first locking features and fixedly hold the midsole portion 16 together with the insole portion 14 and the upper 12 without use of any adhesive material.

Figure 2A:
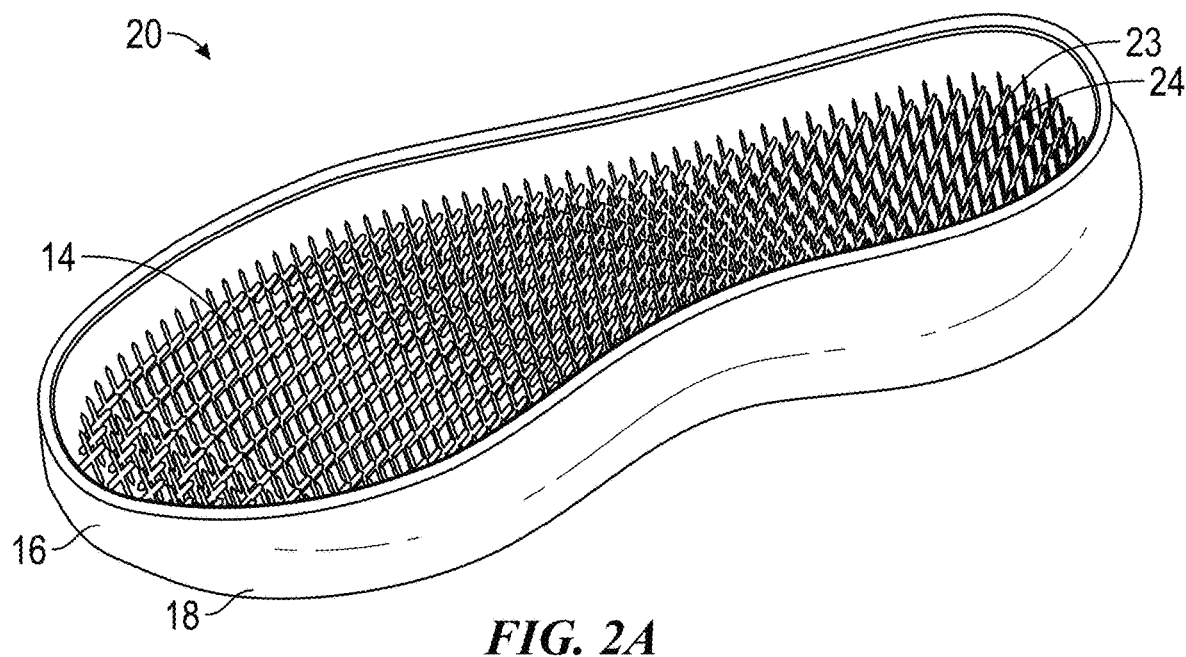
FIGS. 2A and 2B are isometric views of sole assemblies shown removed from the upper of footwear assemblies in accordance with one or more embodiments of the present technology.
Figure 2B:
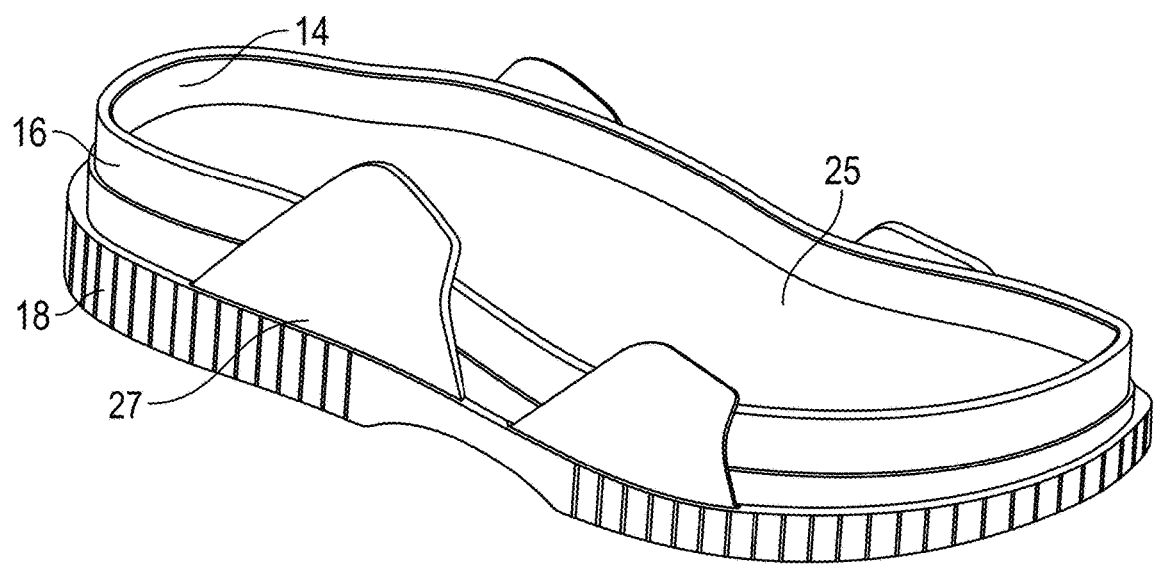

FIGS. 2A and 2B are isometric views of embodiments of the sole assembly 20 shown with the upper removed. The sole assembly 20 is configured to support the foot of a wearer atop an insole portion 14, which is coupled to a midsole portion 16. In the illustrated embodiment, an outsole portion 18, which forms a durable ground-engaging bottom surface, is connected to the midsole portion 16. The midsole and outsole portion 16 and 18 can be integrally connected to each other to form a unitary component. In FIG. 2A, a compressible lattice 23 is part of the insole portion 14 and above a platform layer 25. The compressible lattice 23 has interconnected laths 24 extending away from the platform layer 25 configured to provide support for the wearer's foot. In FIG. 2B, the compressible lattice 23 is part of the insole portion 14 and below the platform layer 25. The outsole portion 18 of the illustrated embodiment has anchor flaps 27 that extend upwardly from side portions of the midsole portion 16 and are configured to attach to an upper, such as sandal straps or other upper features for receiving the wearer's foot. The compressible lattice 23 may be part of the midsole portion 16 or part of the outsole portion 18. In some embodiments, the sole assembly 20 may not include a compressible lattice 23. In some embodiments, a sock liner can be positioned over the insole portion 14 to form the upper surface that engages the wearer's foot.

The insole portion 14, the midsole portion 16, and/or the outsole portion 18 can be made via 3-D printing and/or other additive manufacturing processes, such as selective laser melting (SLM), selective laser sintering (SLS), electron beam melting (EBM), or other powder bed fusion techniques or other additive manufacturing techniques. In some embodiments discussed below, the insole portion 14 and the midsole portion 16 are formed or otherwise made together and integrally connected to each other as a unitary component assembled with the outsole portion 18, which is made separately via additive manufacturing. In other embodiments discussed below, the midsole portion 16 is integrally formed and connected with the outsole portion 18 as a unitary component, and the insole portion 14 is formed separately and attached to the top of the midsole portion 16 during assembly. In yet other embodiments discussed below, the midsole and outsole portions 16 and 18 can have sectional constructions, each with a forefoot portion spaced apart from a heel portion. An arch portion can be positioned between the forefoot and heel portions, although other embodiments may not include the arch portion. This manufacturing process and the materials used for production yield modular components that have several advantages. For example, the modular components can be refurbished and/or recycled separately based on supply and demand. They also decrease the number of separate parts that need to be assembled to construct the sole assembly 20, thereby simplifying the assembly process, decreasing the number of parts for the assembly, reducing assembly time, and decreasing the cost of the footwear assembly 10 (FIGS. 1A and 1B).

Figure 3A:
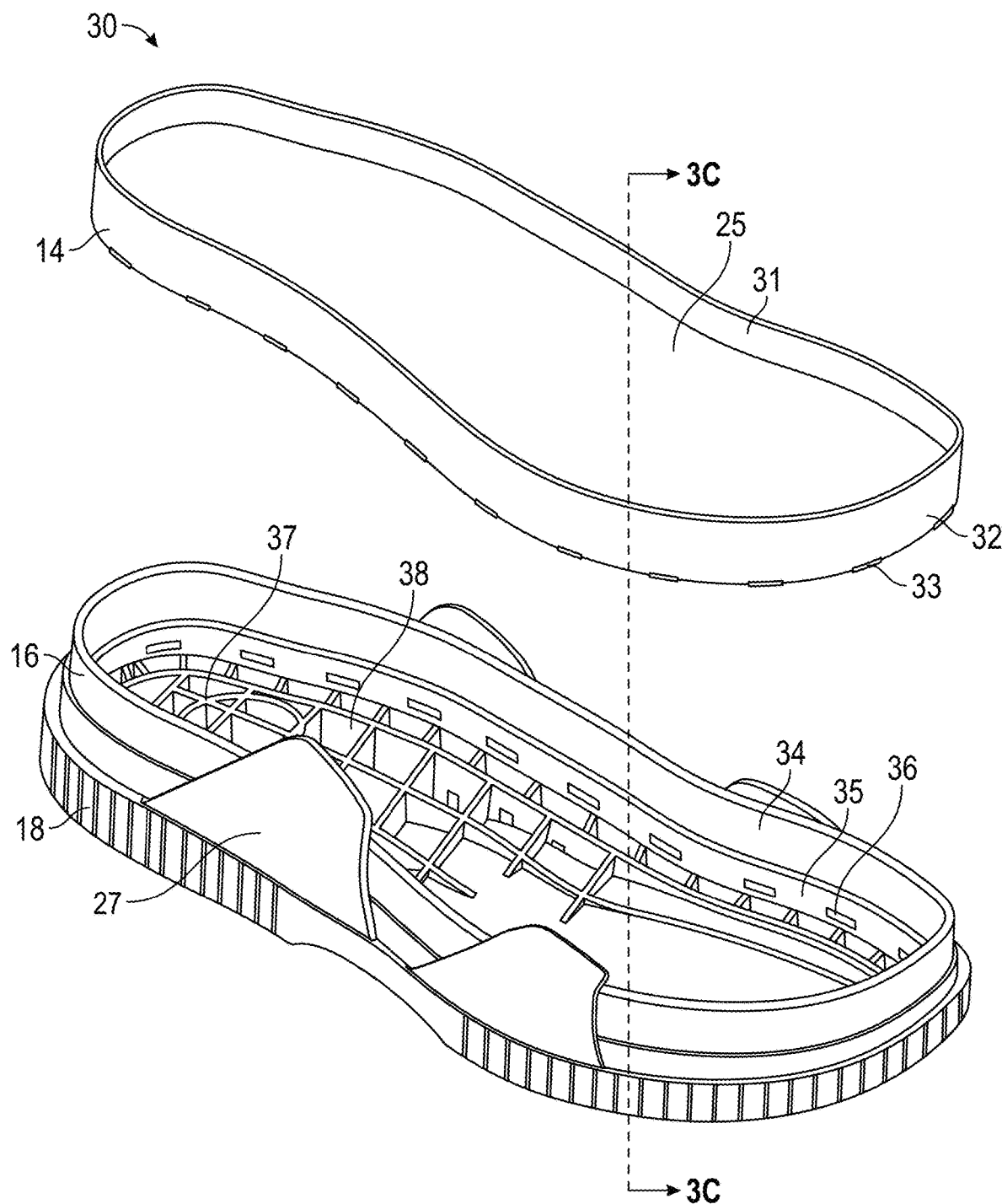
FIGS. 3A and 3B are partially exploded top and bottom isometric views of a sole assembly of an embodiment of the present technology.
Figure 3B:
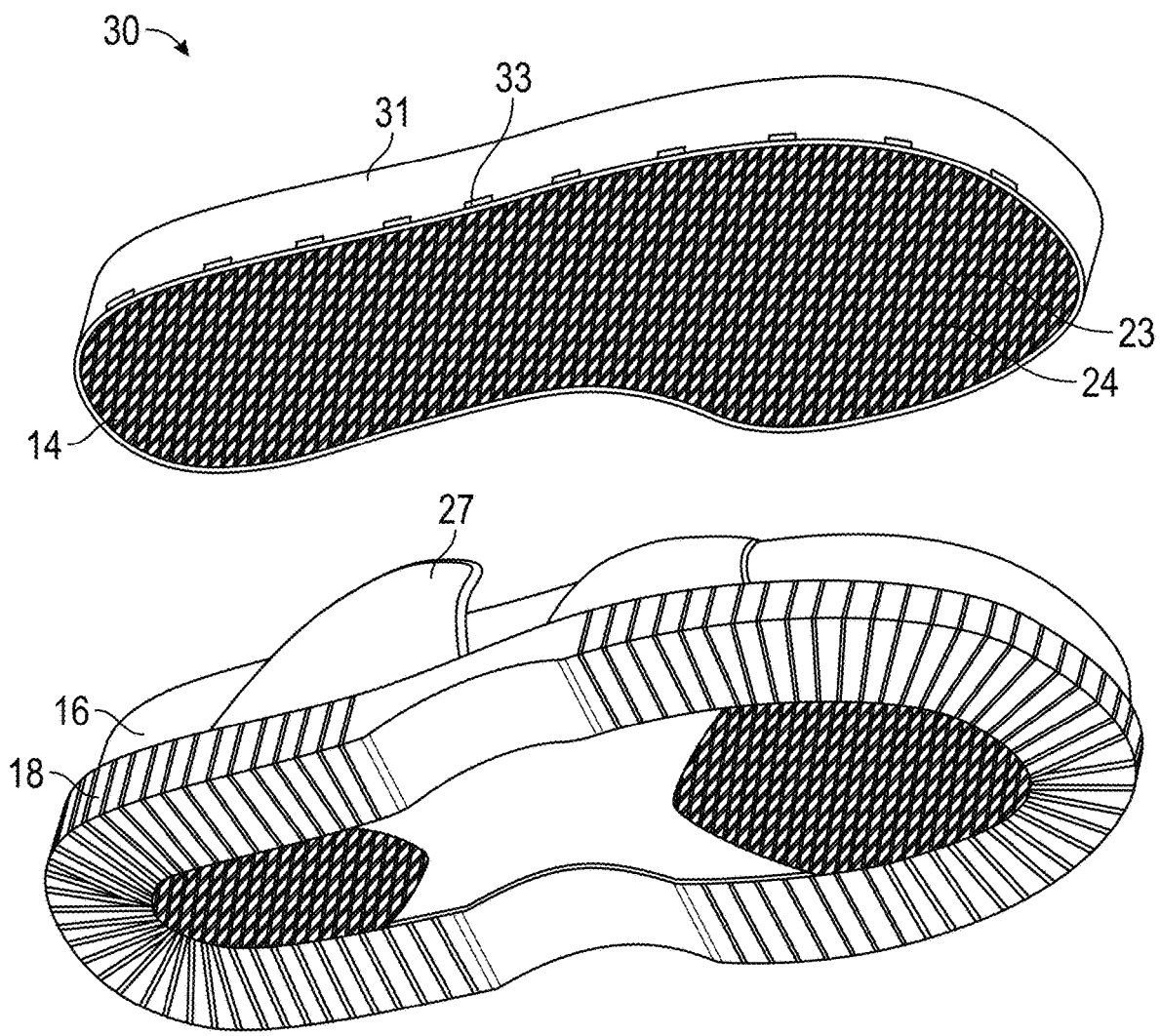
Figure 3C:
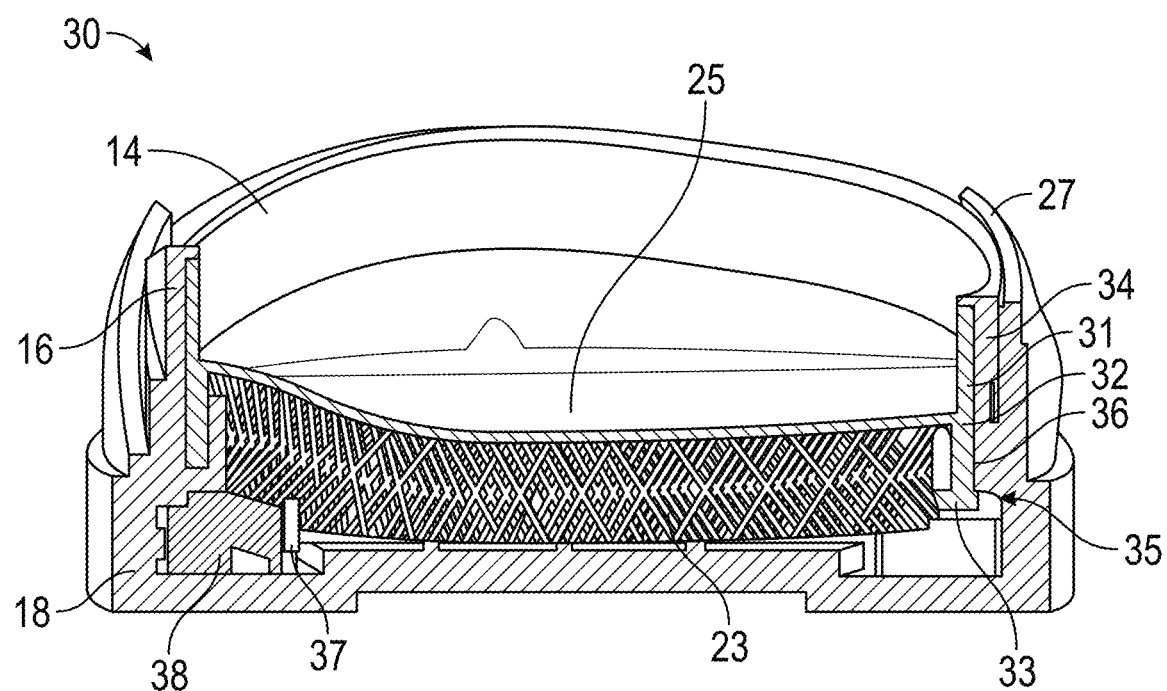
FIG. 3C is an enlarged cross-sectional view taken substantially along the lines 3C-3C of FIG. 3A.

FIGS. 3A and 3B are exploded isometric top and bottom views of a sole assembly 30 shown in FIG. 2B. FIG. 3C is an enlarged cross-sectional view taken substantially along lines 3C-3C of FIG. 3A. The illustrated sole assembly 30 of the illustrated embodiment comprises an insole portion 14 releasably connected to the midsole and outsole portions 16 and 18, which may be integrally formed as a unitary structure or separate components connected to each other. The insole portion 14 has the platform layer 25, and the compressible lattice 23 below the platform layer 25. A flange 31 is positioned radially outward of the lattice 23 along the insole perimeter portion. Insole locking features 32 extend downwardly from the platform layer 25 and have a plurality of engagement hooks 33 configured to engage the midsole portion 16. The midsole portion 16 of the illustrated embodiment has a midsole wall 34 and second locking features 35, which can be formed by slots 36 along the midsole's perimeter portion. The second locking features 35 are spaced apart from the midsole wall 34 such that they provide a friction fit and engagement for the first locking features 32 given the thickness. The slots 36 are configured to mateably engage the hooks 33 to provide a very secure connection to hold the insole and midsole portions 14 and 16 together. This arrangement with the mating locking features 32 and 35 provide for a fixed interconnection between the components, but also allow the insole portion to be removed from the midsole portion, for example, to refurbish the sole assembly or to recycle the components of the assembly.

In some embodiments, an upper (not shown) may be stitched or otherwise mechanically attached (without use of adhesives) to the flange 31, such as to the interior side of the flange, or between the exterior side of the flange 31 and interior side of the midsole wall 34. The midsole and outsole portions 16 and 18 comprise internal support structures 37 that form cavities 38 within the sole assembly 30 and provide support for the foot of the wearer.

In some embodiments, the midsole and outsole portions 16 and 18 are separate components that are not integrally formed. In some embodiments, the compressible lattice 23 is above the platform layer 25. In some embodiments, the plurality of engagement hooks 33 and the plurality of slots 36 may be reversed, such that the hooks are spaced along the second locking features 35 and the slots are spaced along the first locking features 32. In some embodiments, the outsole portion 18 may not have sandal flaps 27.

Figure 4A:
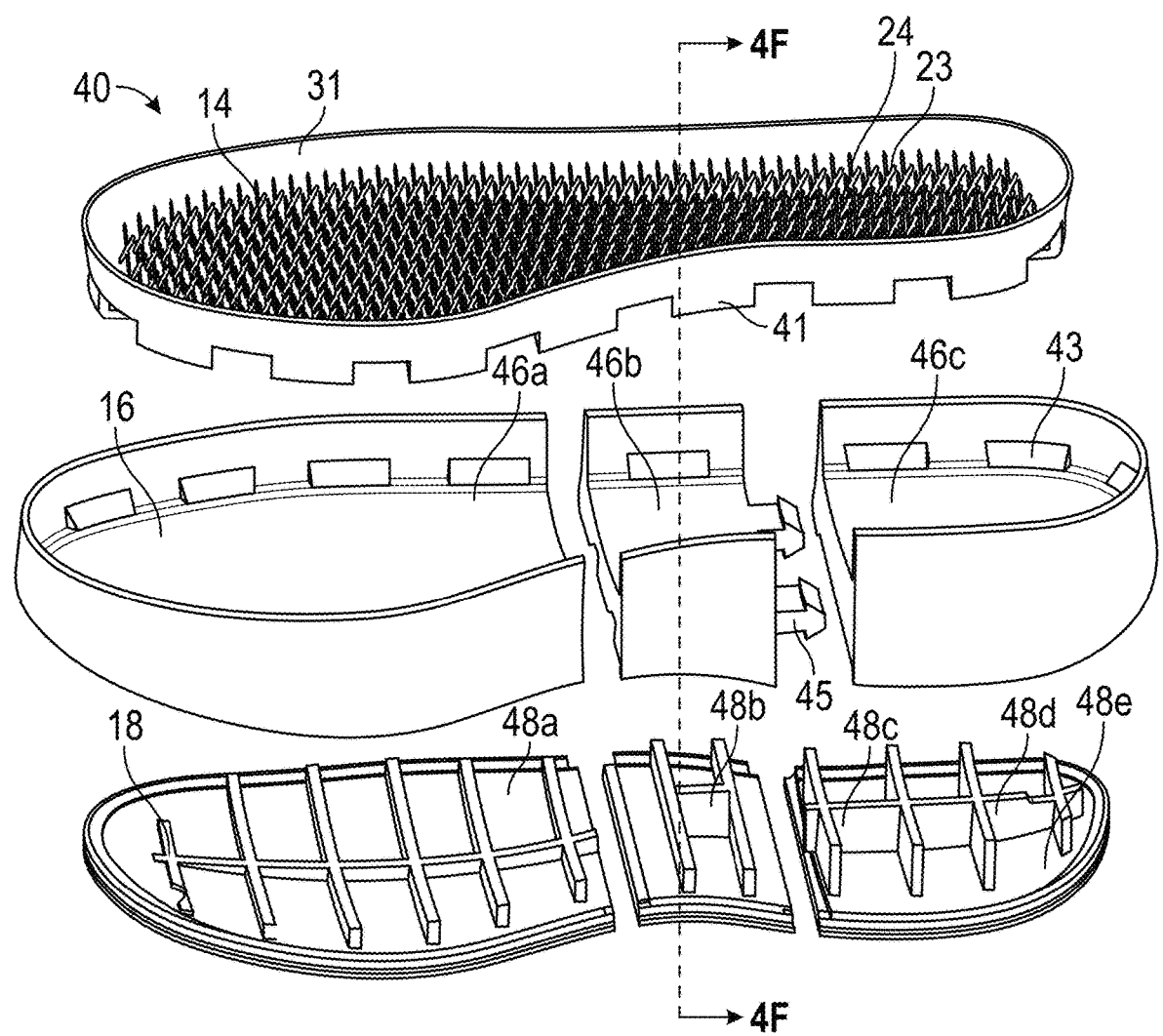
FIGS. 4A and 4B are partially exploded top and bottom views of a sole assembly of another embodiment of the present technology.
Figure 4B:
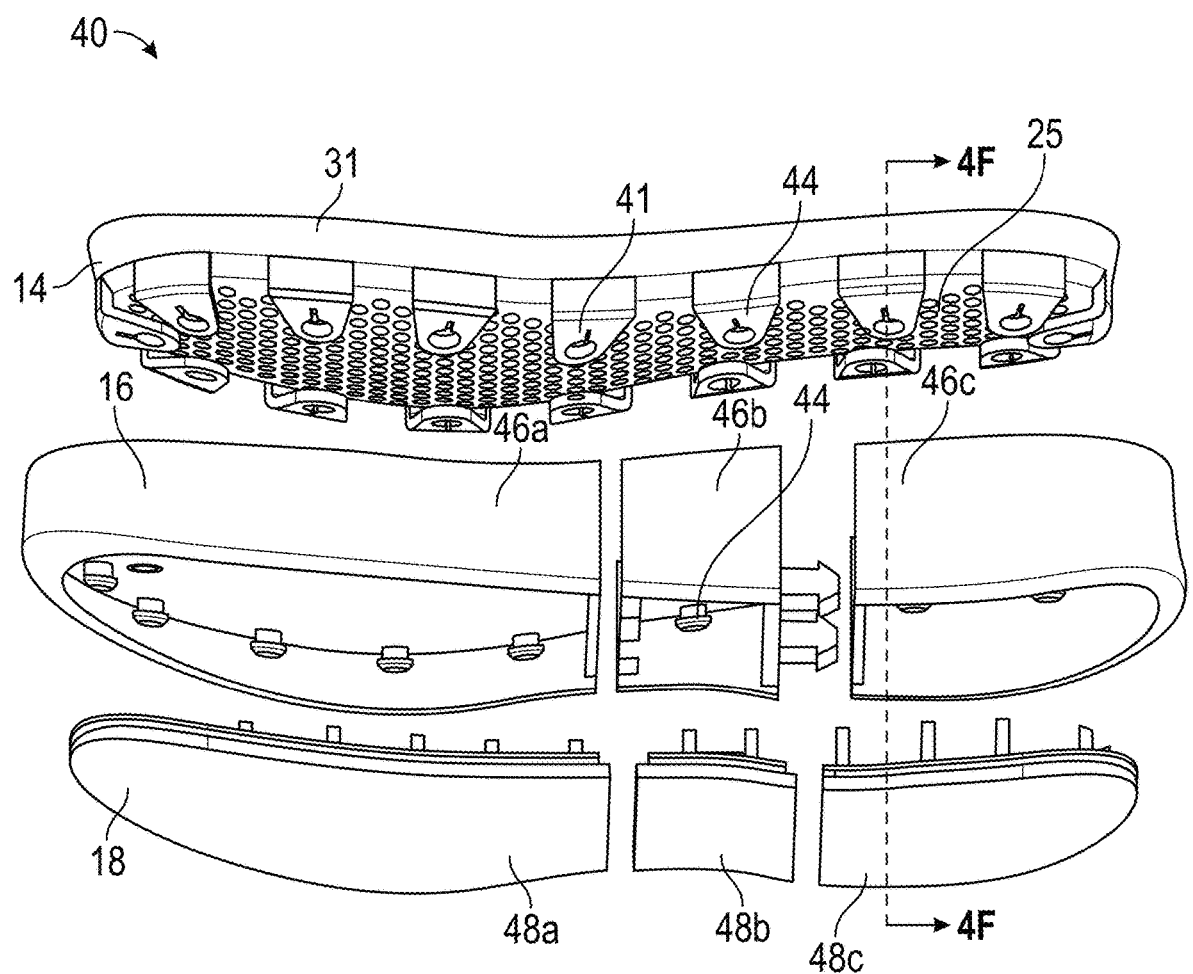

FIGS. 4A and 4B are partially exploded top and bottom views of a sole assembly of another embodiment of the present technology. The sole assembly 40 has the insole portion 14, the midsole portion 16, and the outsole portion 18 formed as interconnectable modular components. The illustrated insole portion 14 comprises the compressible lattice 23 surrounded by the flange 31 to which the upper 12 may be stitched or otherwise attached. The insole portion 14 has a plurality of first locking features 32 formed as locking tabs 41 extending downwardly and inwardly below the platform layer 25. The locking tabs 41 are spaced apart from each other along the insole perimeter portion (FIG. 4E). Each locking tab 41 has an aperture 44 in a distal end portion for securely anchoring to the midsole portion 16. The locking tabs 41 in other embodiments can have other engagement features for connecting to the midsole portion 16. The midsole portion 16 is secured to the insole portion 14 via a plurality of slots 43 along the midsole perimeter portion and second locking features 35, such as a plurality of locking posts 44 extending downwardly from the bottom of the midsole platform. The locking posts 44 are sized and configured to extend through the apertures 44 on the distal ends of the locking tabs 41 that extend through the slots 43 and wrap around and under the midsole's bottom platform. Accordingly, the locking tabs 41 can be quickly connected and securely retained on the midsole portion by extending over and capturing the locking posts 44. Similarly, the locking tabs 41 of the insole portion 14 can be easily and quickly disengaged from the midsole portion 16 by disengaging from the locking posts 44 and being removed from the slots 43 so the insole portion can be separated from the midsole portion 16.

Figure 4C:
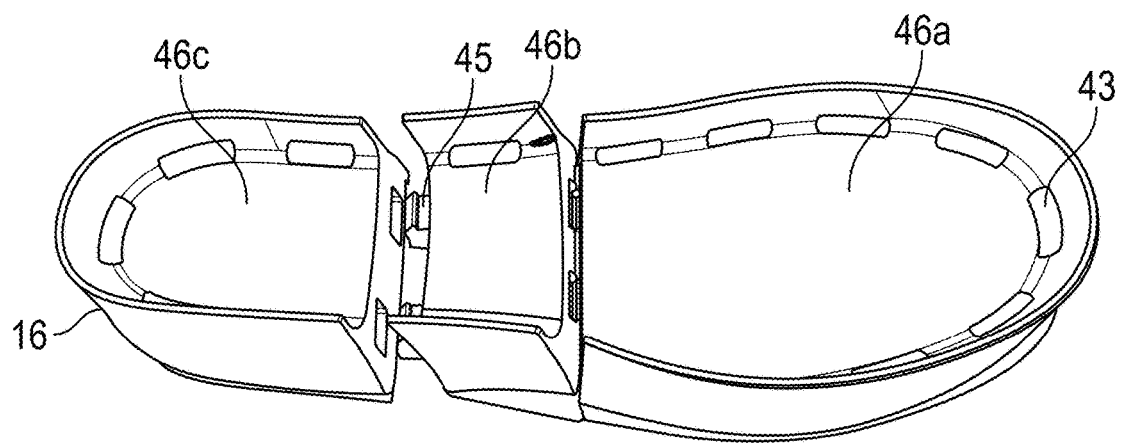
FIG. 4C is a partially exploded top view of the midsole portion of the sole assembly of FIG. 4A.
Figure 4D:
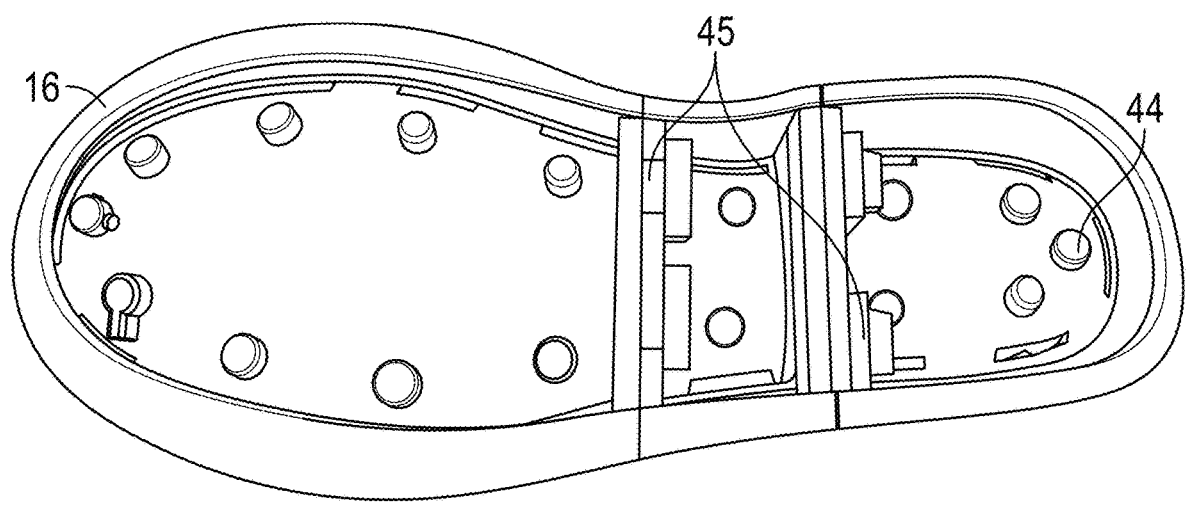
FIG. 4D is a bottom view of the midsole portion of the sole assembly of FIG. 4C with modular components in an assembled configuration.
Figure 4E:
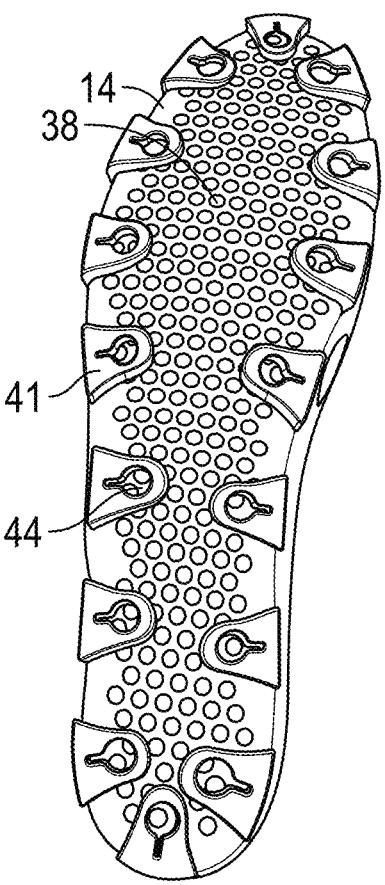
FIG. 4E is a bottom plan view of the insole portion of the sole assembly of FIG. 4A.

FIG. 4C is a partially exploded top view of the midsole portion 16, and FIG. 4D is a bottom view of the midsole portion 16 with the locking posts 44 out of engagement with the insole portion (not shown). The illustrated midsole portion 16 has a modular construction with forefoot portion 46a spaced apart and separate from a heel portion 46c. In some embodiments, a modular arch portion 46b can be positioned between and releasably connected to the modular heel and forefoot portions 46a and 46c. In the illustrated embodiment, the modular arch portion 46b is releasably connected to the forefoot and heel portions 46a and 46c via interlocking features 45 to securely hold the midsole modules together without requiring the use of an adhesive material.

Figure 4F:
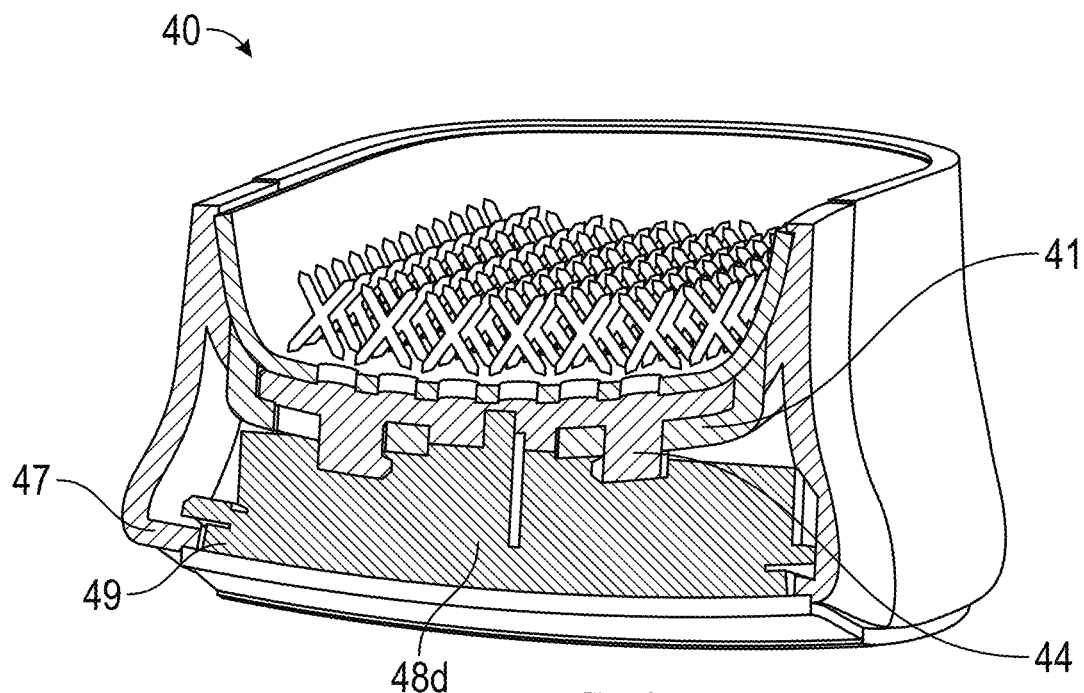
FIG. 4F is a cross-sectional view taken substantially along lines 4F-4F of FIG. 4A.

As illustrated in FIGS. 4A and 4B, the outsole portion 18 similarly comprises a modular forefoot portion 48a, a modular arch portion 48b, and a modular heel portion 48c. FIG. 4F is a cross-sectional view of the sole assembly 40 substantially along line 4F-4F of FIG. 4B. The midsole portion 16 has a lower perimeter flange 47 extending around the midsole portion, and the outsole portion 18 has an engagement portion 49 that releasably mates with the lower perimeter flange 47 to securely retain the outsole portion 18 on the midsole portion 16. The outsole portion 18 further comprises a plurality of internal support structures 48d that define cavities 48e, which also support the foot of the wearer. Accordingly, the outsole's forefoot portion 48a, arch portion 48b, and heel portion 48c securely and releasably attach to the bottom of the midsole's forefoot portion 46a, arch portion 46b, and heel portion 48c, respectively, to form the lower ground-engaging surface of the sole assembly.

Figures 5A, 5B:
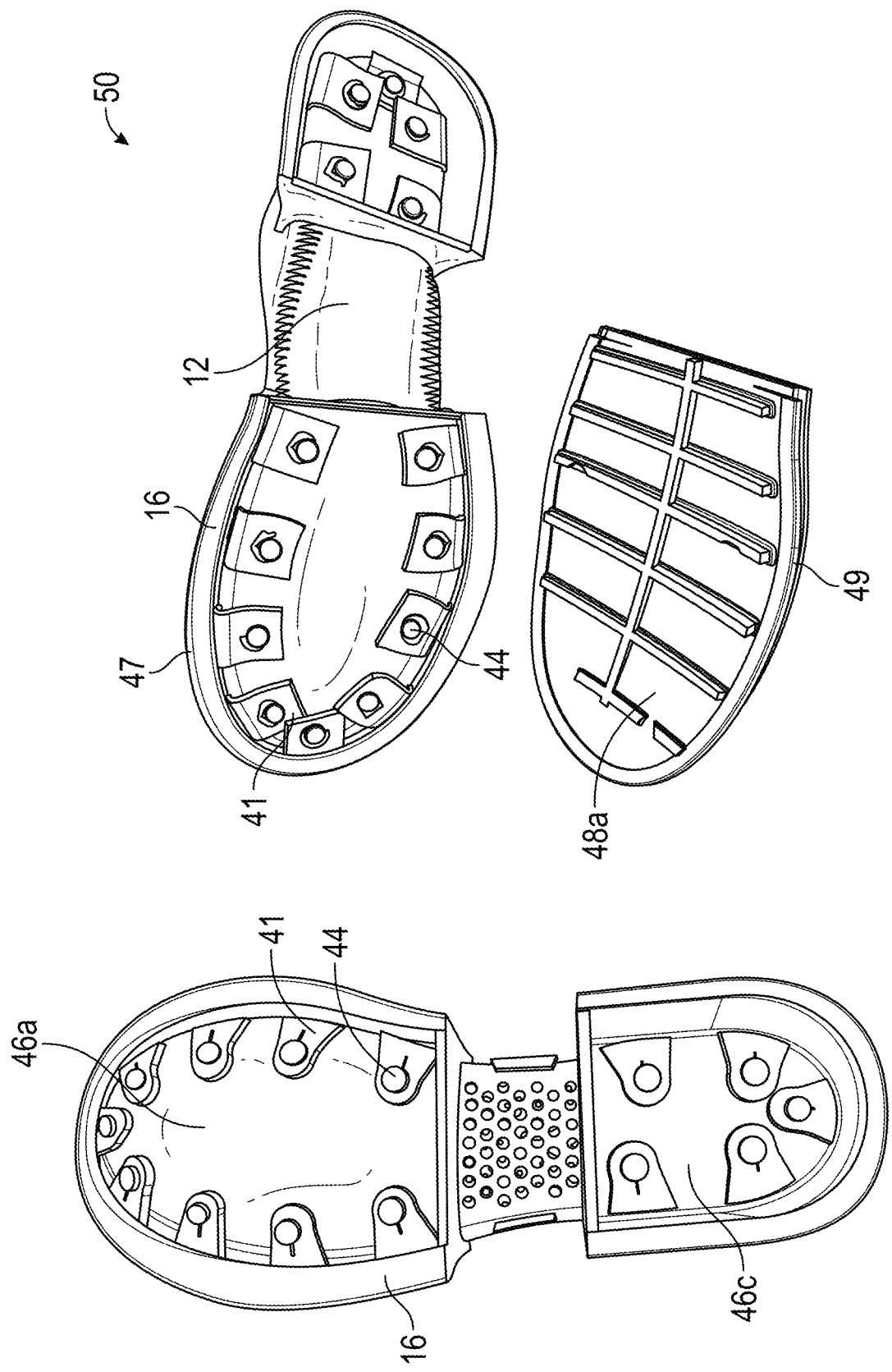
FIG. 5A is a bottom view of the upper and midsole portions assembled and with the outsole portions not shown for purposes of clarity.
FIG. 5B is a partially exploded, bottom view of the modular sole assembly showing a forefoot portion of the outsole separated from the forefoot portion of the midsole portion in accordance with an embodiment of the present technology.

In some embodiments, as shown in FIGS. 5A and 5B, the midsole portion 16 does not include the modular arch portion 46b, so the forefoot portion 46a and the heel portion 46c are spaced apart from and separate from each other. Similarly, the modular outsole portion would not use the arch portion 48c. This can serve both functional purposes (e.g., improved bending of the sole assembly 50) and aesthetic purposes (FIG. 5D). In other embodiments, the midsole portion 16 and/or the outsole portion 18 are one-piece, full-foot components that can be made by 3-D printing or other additive manufacturing processes.

Figure 5C:
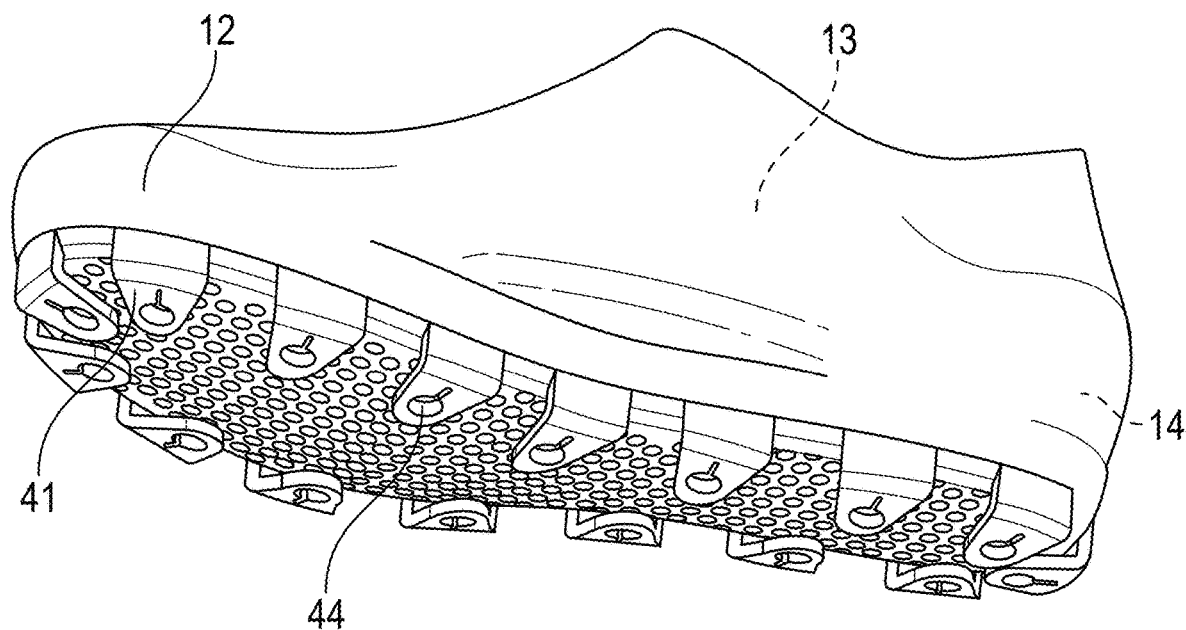
FIG. 5C is an isometric view of the upper that attaches to the insole portion of the sole assembly of FIG. 5A.
Figure 5D:
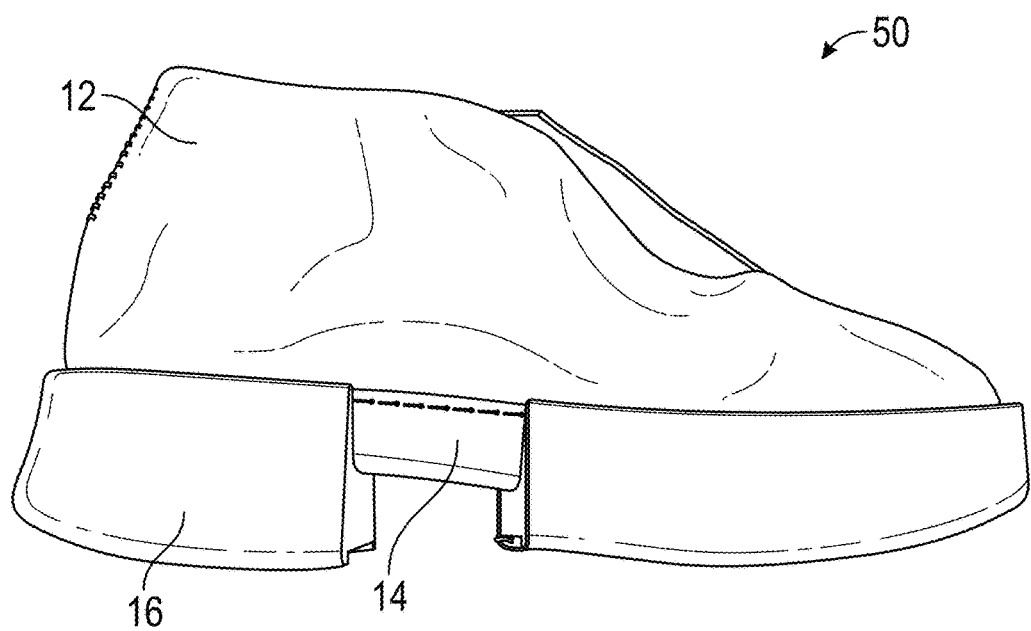
FIG. 5D is a side view of the sole assembly of FIG. 5A showing a heel module separated from a forefoot module of the midsole assembly.

In another embodiment shown in FIGS. 5B and 5C, the locking tabs 41 are connected to the lower perimeter portion of the upper 12 rather than on the insole portion. In these embodiments, the insole portion 14 can be positioned within the interior area of the upper 12, or the upper 12 can be positioned atop the insole portion 14 with the locking tabs 41 extending over the peripheral edges of the insole portion and through the slots 43 in the midsole portion to securely capture and retain the insole portion 14 between the upper and the midsole portion 16.

Figure 6A:
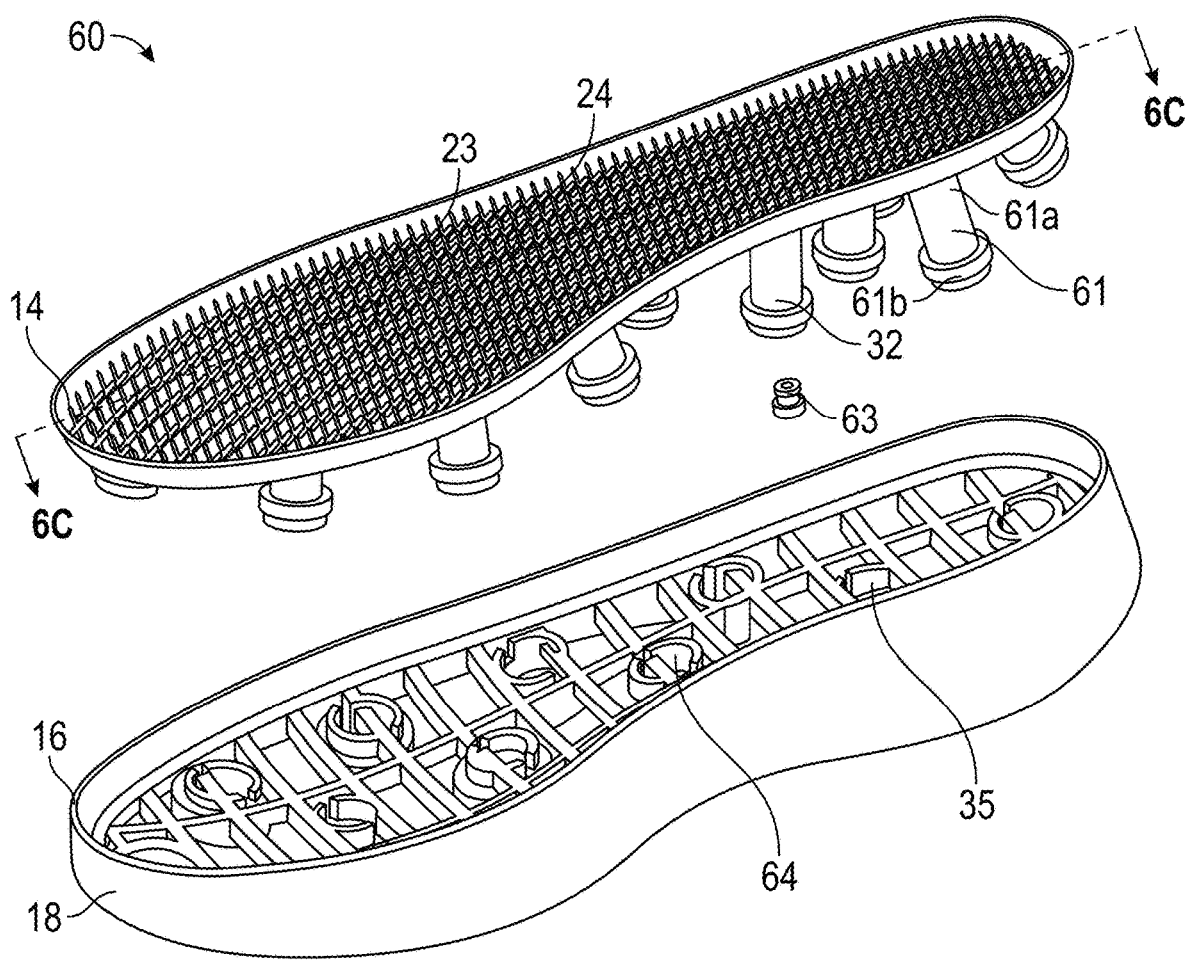
FIG. 6A is a partially exploded isometric view of a sole assembly of an embodiment of the present technology.
Figure 6B:
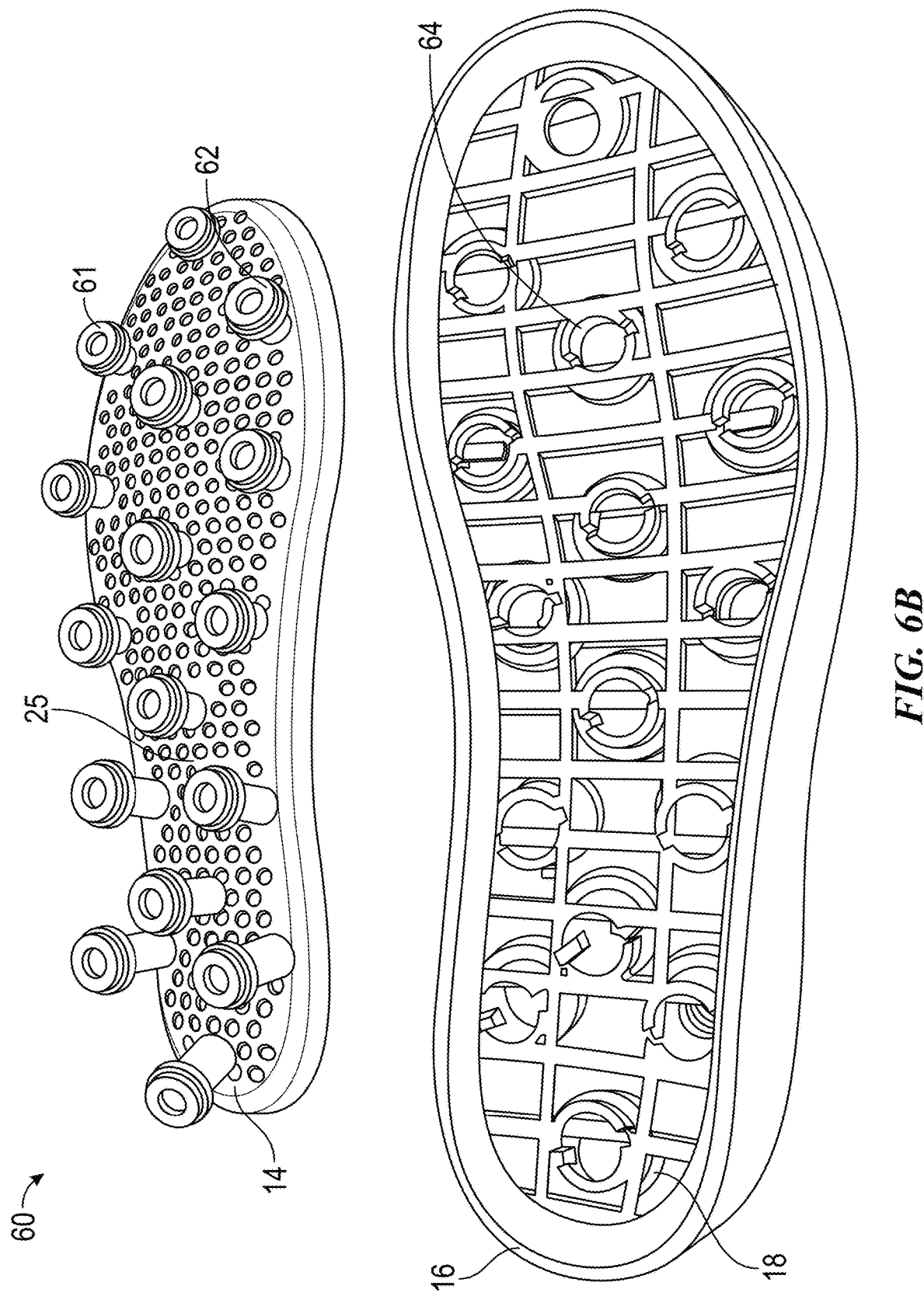
FIG. 6B shows the bottom of the insole portion separated from the top of the midsole portion of the sole assembly of FIG. 6A.
Figure 6C:
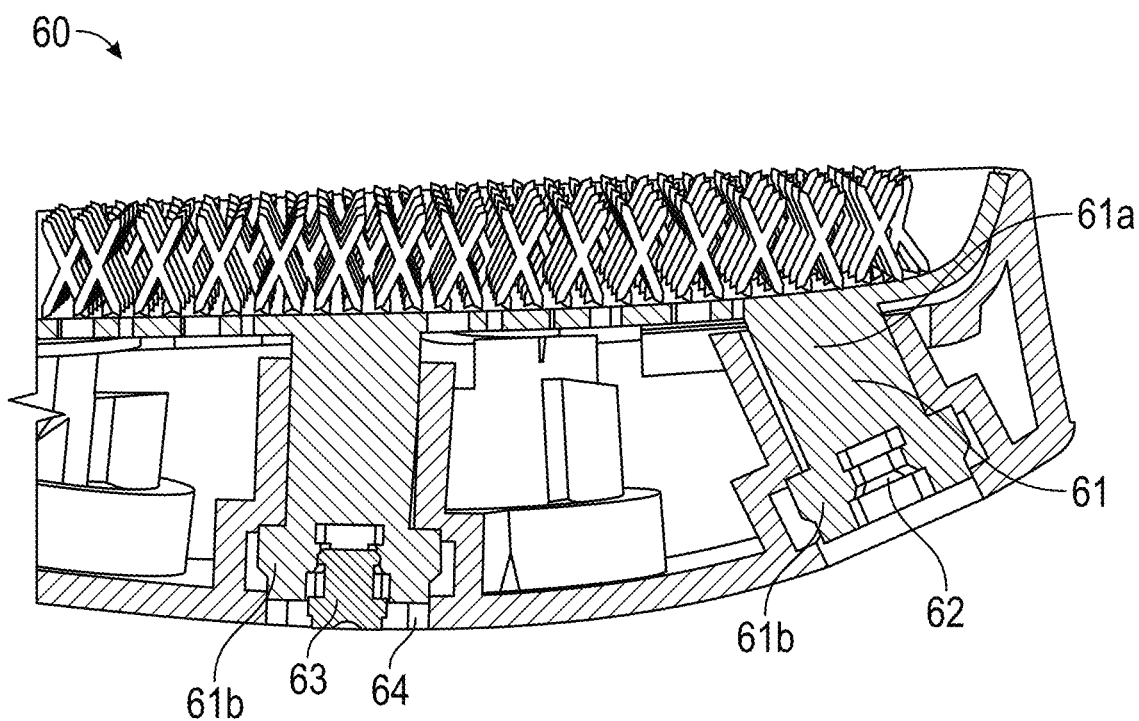
FIG. 6C is an enlarged, partial cross-sectional view of the heel area of the sole assembly of FIG. 6A.

FIGS. 6A, 6B, and 6C illustrate a sole assembly 60 of another embodiment of the present technology. The sole assembly 60 has the insole portion 14, the midsole portion 16, and the outsole portion 18. The insole portion 14 can include the compressible lattice 23 extending upwardly from the platform layer 25 and locking features 32 extending downwardly from the bottom of the platform layer 25. The first locking features 32 of the illustrated embodiment are a plurality of plugs 61 integrally connected to the platform layer 25 at proximal ends 61a, and free distal ends 61b are spaced below the platform layer 25 and configured to attach to the midsole portion 16. The midsole portion 16 has a plurality of second locking features 35 formed by a plurality of holes 64 that mateably receive and engage the plurality of plugs 61 to releasably attach the insole portion 14 to the midsole portion 16. In the illustrated embodiment, the distal end 61b of each plug 61 includes an expansion aperture 62, which are each configured to receive an expander insert 63 that expands the distal end 61b of the plugs 61 to help expand the diameter of the distal end 61b to lock the plug 61 in the mating hole 64 in the midsole portion 16. In other embodiments, the distal end 61b of each plug 61 can have a different shape that releasably engages the midsole portion 16 at the respective hole 64 to lock the plugs in place, thereby securely interconnecting the insole and midsole portions without using adhesive materials.

FIGS. 7A and 7B illustrate a sole assembly 70 of another embodiment of the present technology, wherein the insole portion 14 has a plurality of plugs 61 and a plurality of snapping hooks 71 that form the first locking features 32. The midsole portion 16 has a plurality of holes 64 and grooves 74 that form the second locking features 35. The plurality of holes 64 mateably receive and engage the plurality of plugs 61, and the plurality of grooves 74 is configured to mateably receive and engage the plurality of snapping hooks 71 to releasably lock the insole portion 14 to the midsole portion 16. In the illustrated embodiment, the upper 12 has a closed bottom end with a plurality of openings 75 that match the pattern of the first locking features 32. The insole portion 14 can be inserted inside the upper 12 such that the plugs 61 and snapping hooks 74 project through the openings 75. The plugs 61 and snapping hooks 71 can then extend into the holes 64 and lock in place within the midsole portion to hold the insole and midsole portions 14 and 16 together with the bottom of the upper 12 securely captured between the insole and midsole portions 14 and 16.

Figure 8:
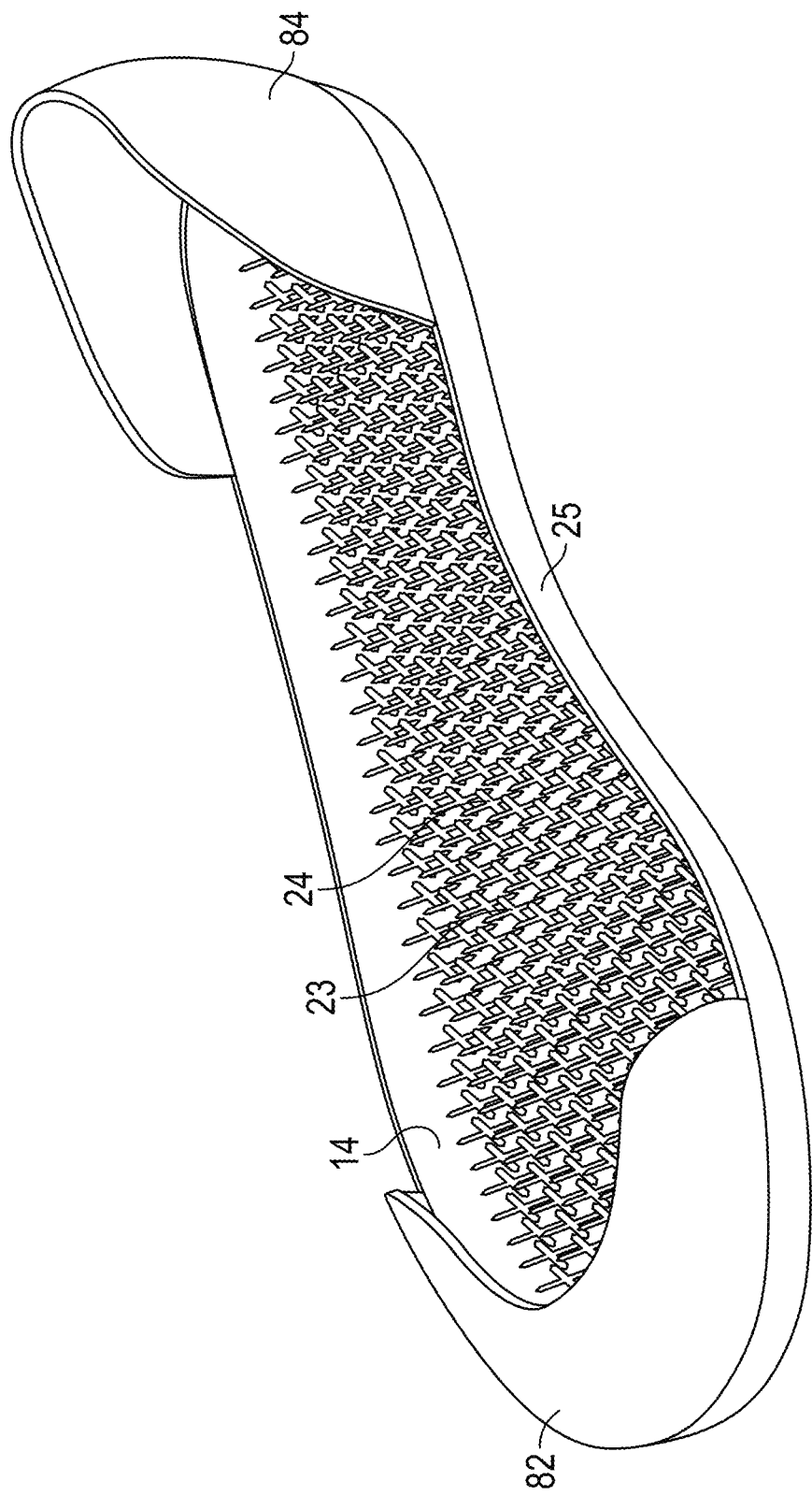
FIG. 8 is an isometric view of the insole portion of a sole assembly of an embodiment of the present technology, wherein the insole portion has a toe cap and a heel cup projecting from a perimeter of the insole portion.

As seen in FIG. 8, in some embodiments, the insole portion 14 can include an integral toe cap 82 and a heel counter 84 extending upwardly relative to the platform layer 25. Other embodiments can include just the toe cap 82 or just the heel counter 84. The insole portion 14 can be positioned within the upper 12 so that the toe cap 82 and/or the heel counter 84 are covered and enclosed by the upper 12. The upper 12 can have a bottom panel with openings that receive the first locking features 32 as described above in connection with FIG. 7A. In other embodiments, the lower perimeter portion of the upper can be stitched to a flange extending around the periphery of the insole portion. In yet other embodiments, the insole portion 14 with the toe cap 82 and/or the heel counter 84 can be exterior of the upper 12 and connected to the midsole portion 16 in the manner discussed above.

Figure 9B:
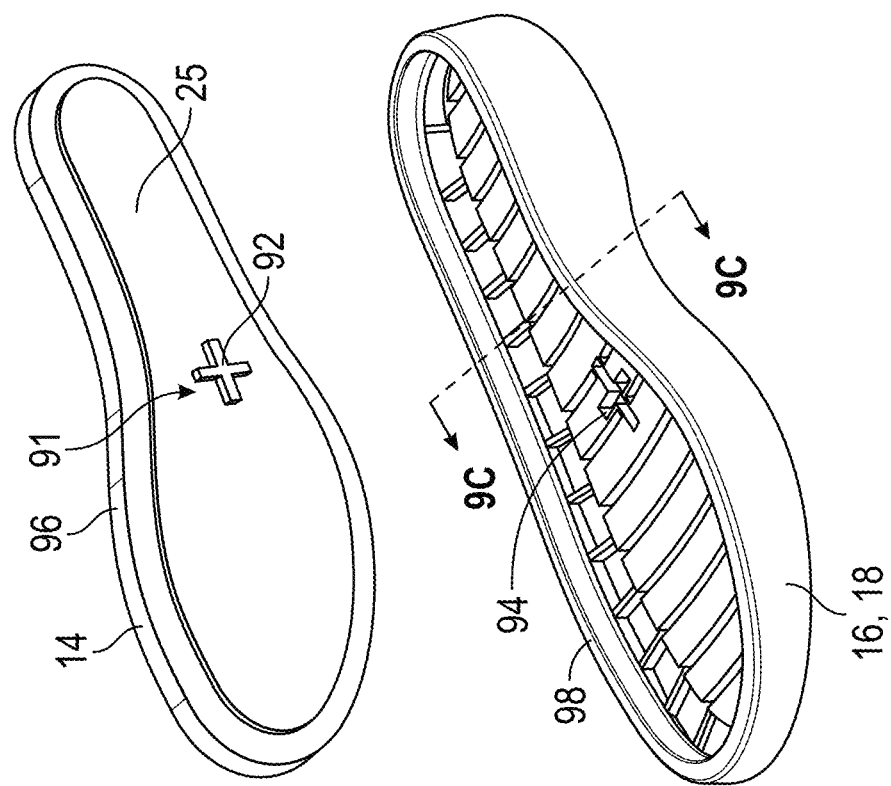
FIG. 9B shows the bottom of the insole portion separated from the top if the midsole portion of the sole assembly of FIG. 9A.
Figure 9A:
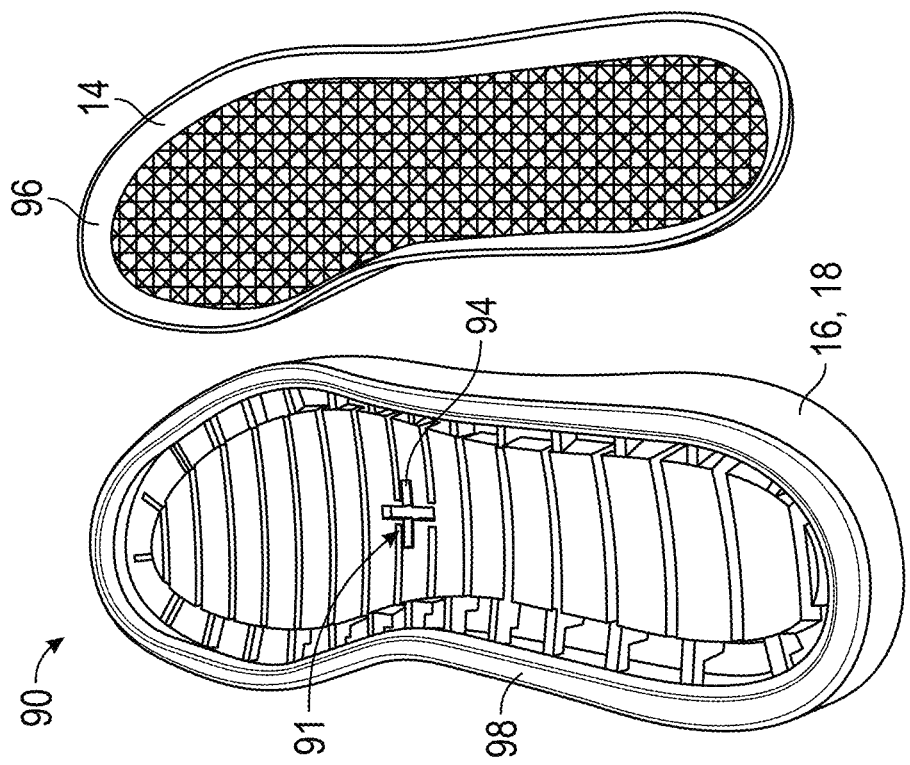
FIG. 9A is a top isometric view of an insole portion separated from a midsole portion of an embodiment of the present technology.
Figure 9C:
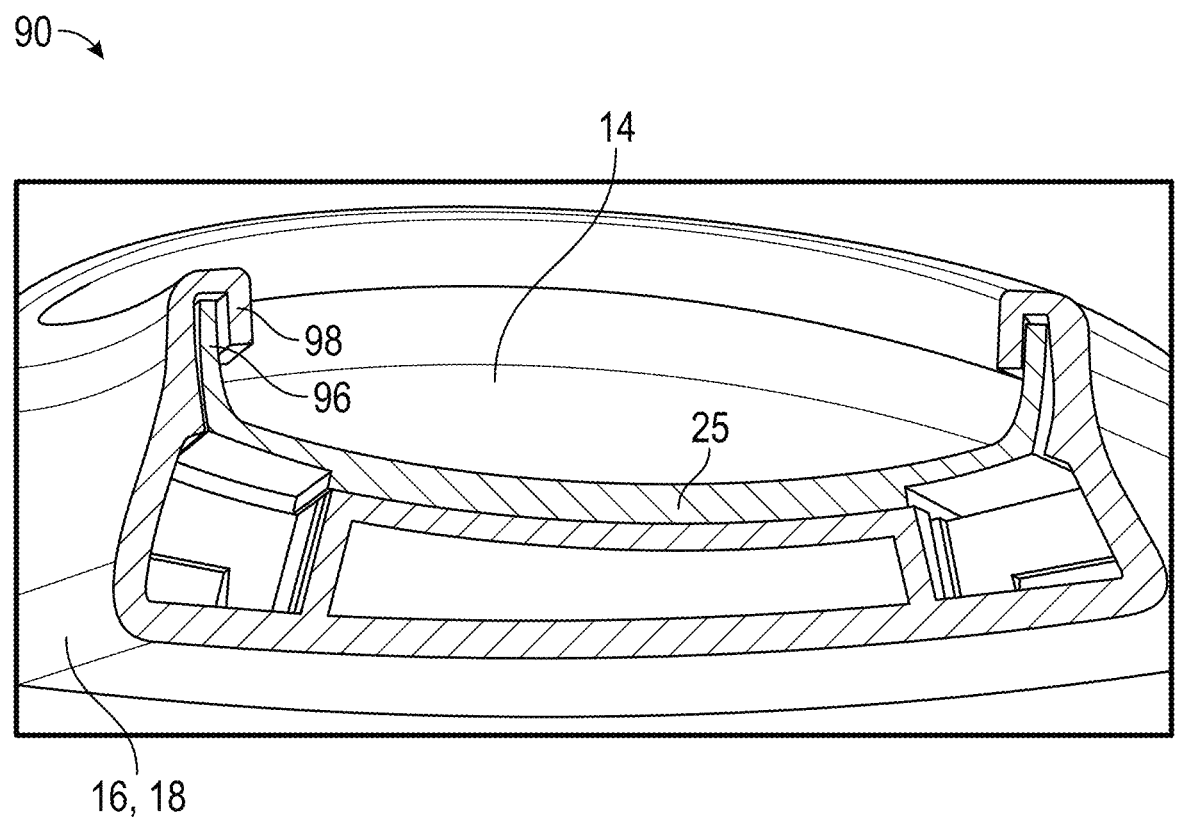
FIG. 9C is an enlarged cross-sectional view of the sole assembly of FIG. 6A taken substantially along line 9C-9C.

FIGS. 9A and 9B illustrate a sole assembly 90 of another embodiment of the present technology. FIG. 9C is an enlarged cross-sectional view of the sole assembly of FIG. 6A taken substantially along line 9C-9C. The sole assembly has an insole portion 14 configured to press or snap into locked engagement with the midsole portion 16. The insole portion 14 has a perimeter flange 96 extending upwardly from the platform layer 25. In another embodiment, the insole portion 14 may comprise the perimeter flange 96 without a platform layer and the upper 12 may be sewn to the perimeter flange 96. The midsole portion 16 captures the perimeter flange 96 of the insole portion 14 in a hooked flange 98 formed around the upper perimeter of the midsole portion 16. Accordingly, during assembly, the insole portion 14 can be positioned atop the midsole portion 16 and pushed downwardly. This causes the insole perimeter flange 96 to slightly flex inwardly and the midsole's hooked flange 98 to flex outwardly until the hooked flange 98 can snap back over and capture the top of the insole's perimeter flange in the hook portion of the midsole's hooked flange 98 in a friction fit to releasably affix the insole portion 14 to the midsole portion 16. In this embodiment, the insole's perimeter flange 96 is configured to allow the lower peripheral portion of the upper (not shown) to be stitched to the interior surface of the flange 96. Accordingly, the interior portion of the midsole's hook flange 98 will be captured between the upper and the top portion of the insole's flange 96.

The sole assembly 90 can include an alignment feature 91 that helps maintain alignment of the insole portion 14 relative to the midsole portion 16 during and after installation of the insole portion. In the illustrated embodiment, the alignment feature 91 includes a projection 92 with a selected shape, such as a "+" shape, extending from the bottom of the insole portion's platform layer 25. The projection 92 in other embodiments can have different shapes. A mating receptacle 94 with the same shape is formed in the midsole portion. During and after installation of the insole portion 14, the projection 92 extends into and is received by the receptacle 94 so as to block the insole portion 14 from sliding or otherwise moving laterally relative to the midsole portion. Although the illustrated embodiment shows one alignment feature with the projection on the insole portion, other embodiments can include more than one alignment feature 91, and the alignment feature(s) can include the projection portion on the midsole portion 16 and the receptacle on the insole portion14.

Figure 10:
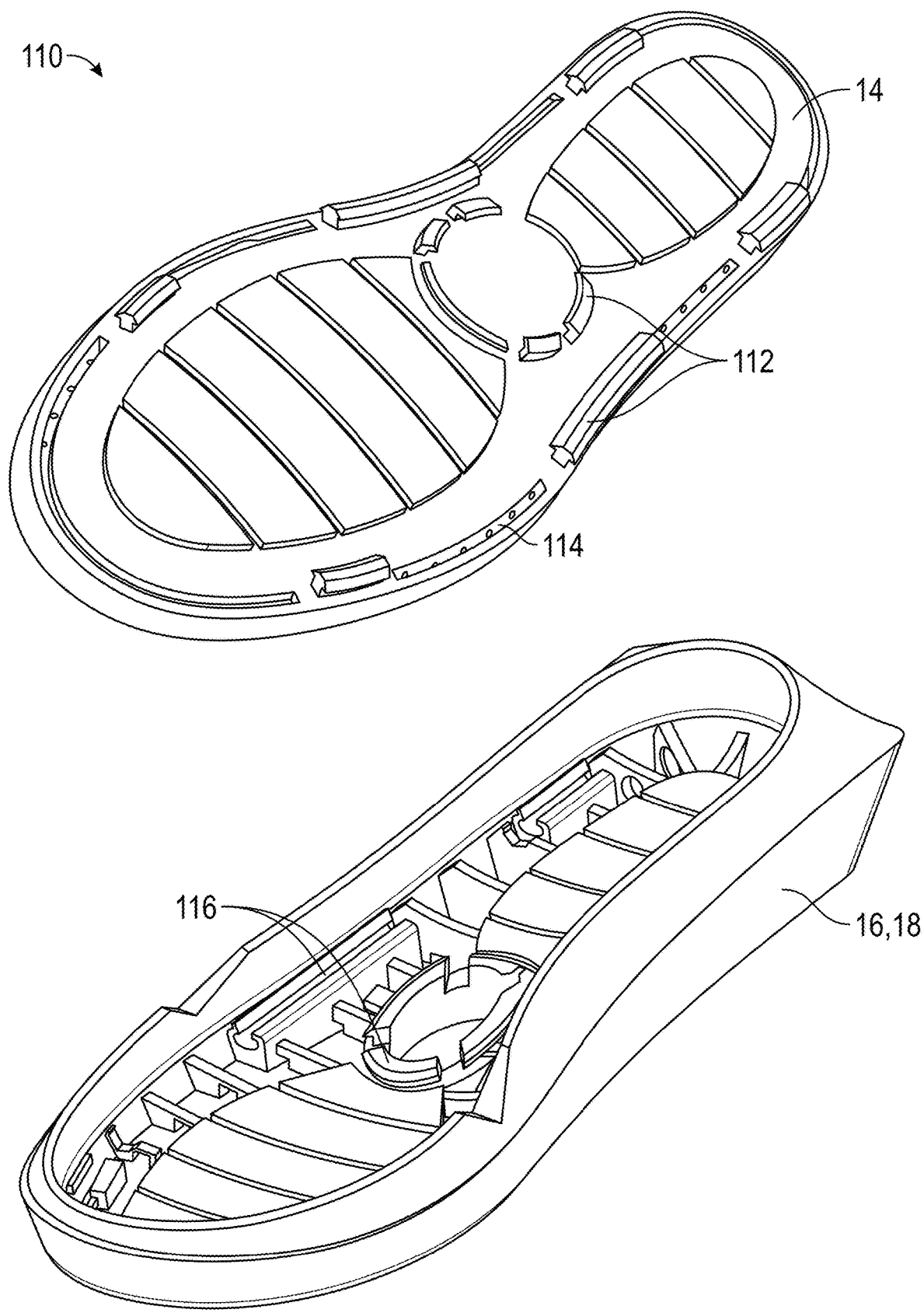
FIG. 10 is an isometric view of a sole assembly of an embodiment of the present technology.

FIG. 10 illustrates a sole assembly 110 of an embodiment of the present technology. In this embodiment, the insole portion 14 has locking features that include a plurality of hooks 112 and a plurality of slots 114 along the insole perimeter portion. The midsole portion 16 has second locking features formed by a plurality of grooves 116 configured to mateably engage the plurality of hooks 112 to securely and releasably join the insole portion 14 and the midsole portion 16 together without requiring the use of adhesive materials.

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control. In other embodiments

We claim:

1. A footwear assembly, comprising:
    an upper defining an interior area configured to receive a foot of a wearer, the upper comprising a lower perimeter portion; and
    a modular sole assembly secured to the lower perimeter portion of the upper, wherein the sole assembly is made by one or more additive manufacturing processes and is free of adhesive materials, the sole assembly comprising:
        an insole portion connected to the lower perimeter portion of the upper and comprising a compressible lattice configured for absorption of compressive loads from the wearer's foot, the lattice having interconnected laths extending away from a platform layer configured to provide support for the wearer's foot, the insole portion having an insole perimeter portion, and the insole portion forming a first sole module;

a midsole portion connected to the insole portion, and comprising a midsole perimeter portion that interfaces with the insole perimeter portion, wherein at least the midsole portion forms a second sole module releasably affixed to the first sole module;

a modular outsole portion connected to the midsole portion and positioned to form a ground engaging surface;

first locking features integrally formed along the lower perimeter portion of the upper or along the insole perimeter portion; and second locking features integrally formed along the midsole portion and configured to releasably mate with the first locking features and fixedly hold the midsole portion together with the insole portion and the upper without use of adhesive material;

wherein the midsole portion comprises a modular forefoot portion, a modular heel portion spaced apart from and separate from the modular forefoot portion, and a modular arch portion between the modular forefoot portion and the modular heel portion, wherein the modular forefoot portion, the modular heel portion, and the modular arch portion are individual components connected to each other and each releasably connect to the modular outsole portion and the insole portion without the use of adhesive material.

2. The footwear assembly of claim 1 wherein the insole perimeter portion comprises a flange radially outward of the lattice, and the first locking features are integrally formed along the insole perimeter portion.

3. The footwear assembly of claim 1 wherein the first locking features are integrally formed along the lower perimeter portion of the upper and extend downwardly past the insole perimeter portion and releasably connect to the second locking features.

4. The footwear assembly of claim 1 wherein the insole perimeter portion comprises a flange radially outward of the lattice, and the lower perimeter portion of the upper is coupled to the flange.

5. The footwear assembly of claim 1 wherein the first locking features extend downwardly from the platform layer of the insole portion and have a plurality of engagement hooks, and the second locking features comprise a plurality of slots along the midsole perimeter portion and configured to mate with and releasably retain the engagement hooks.

6. The footwear assembly of claim 1 wherein the first locking features comprise a plurality of locking tabs spaced apart from each other along the lower the A perimeter portion of the upper or along the insole perimeter portion, and the locking tabs having an aperture in a distal end portion, and the second locking features comprise a plurality of locking posts extending from the midsole portion, wherein the second locking features releasably engage the first locking features with the locking posts extending through the apertures of the locking tabs.

7. The footwear assembly of claim 6 wherein the midsole portion comprises a plurality of slots positioned along the midsole perimeter portion, wherein the locking tabs extend through the slots and connect to the locking posts to fixedly hold the midsole portion together with the insole portion and the upper.

8. The footwear assembly of claim 6 wherein the plurality of locking tabs is integrally attached to the insole perimeter portion.

9. The footwear assembly of claim 6 wherein the plurality of locking tabs is attached to the perimeter portion of the upper.

10. The footwear assembly of claim 1 wherein the modular arch portion is releasably connected to each of the modular forefoot and heel portions.

11. The footwear assembly of claim 1 wherein the first locking feature comprises a plurality of plugs extending downwardly from a bottom surface of the insole portion, and the second locking feature comprises a plurality of holes configured to mateably receive and engage the plurality of plugs to releasably attach the insole portion to the midsole portion.

12. The footwear assembly of claim 11 wherein a distal end of each of the plurality of plugs have an expansion aperture, and further comprise a plurality of expander inserts configured to be inserted into the expansion apertures and to expand the distal ends of the plugs to prevent the plugs from being removed from the second locking features while the expander inserts are in the expansion apertures.

13. The footwear assembly of claim 1 wherein the insole portion further comprises a toe cap and a heel counter extending upwardly relative to the platform and configured to be covered by the upper.

14. The footwear assembly of claim 1 wherein the midsole portion comprises a lower perimeter flange extending around the midsole portion and having a first engagement portion, and wherein the outsole portion comprises an outsole perimeter portion with a second engagement portion that releasably mates with the first engagement portion to securely retain the outsole portion on the midsole portion.

15. The footwear assembly of claim 14 wherein the modular forefoot portion is a modular first forefoot portion and the modular heel portion is a modular first heel portion, wherein the outsole portion comprises a modular second forefoot portion and a modular second heel portion, wherein the modular second forefoot portion releasably attaches to the modular first forefoot portion along a bottom of the midsole portion, and the modular second heel portion releasably attaches to the modular first heel portion along the bottom of the midsole portion.

16. The footwear assembly of claim 1 wherein the first locking feature comprises a first flange extending upwardly relative to the platform layer around at least a portion of the insole portion, and the second locking feature comprises a second flange with a channel formed along and configured to capture the first flange therein when the insole portion is positioned above the midsole portion.

17. A footwear assembly, comprising:
an upper defining an interior area configured to receive a foot of a wearer, the upper comprising a lower perimeter portion; and
a modular sole assembly secured to the lower perimeter portion of the upper, wherein the sole assembly is made by one or more additive manufacturing processes and is free of adhesive materials, the sole assembly comprising:
an insole portion comprising a compressible lattice and a flange extending radially outward of the compressible lattice, the flange coupled to the lower perimeter portion of the upper, the compressible lattice configured for absorption of compressive loads from the wearer's foot, the lattice having interconnected laths extending away from a platform layer configured to provide support for the wearer's foot, the insole portion having an insole perimeter portion, and the insole portion forming a first sole module;

a midsole portion connected to the insole portion, and comprising a midsole perimeter portion that interfaces with the insole perimeter portion, wherein at least the midsole portion forms a second sole module releasably affixed to the first sole module;

an outsole portion connected to the midsole portion and positioned to form a ground engaging surface;

first locking features integrally formed along the lower perimeter portion of the upper or along the insole perimeter portion; and second locking features integrally formed along the midsole portion and configured to releasably mate with the first locking features and fixedly hold the midsole portion together with the insole portion and the upper without use of adhesive material.

18. The footwear assembly of claim 17 wherein the flange is coupled to the lower perimeter portion of the upper on an exterior side of the flange.

19. The footwear assembly of claim 17 wherein the lower perimeter portion of the upper is captured between the flange and the midsole perimeter portion.

* * * * *